United States Patent [19]

Greenhalgh et al.

[11] Patent Number: 5,385,668
[45] Date of Patent: Jan. 31, 1995

[54] APPARATUS FOR SEPARATING PARTICULATE MATERIAL FROM A LIQUID MEDIUM

[75] Inventors: Lennox P. H. Greenhalgh, Bedfordview; Robert P. Riley, Parkrand, both of South Africa

[73] Assignee: Bateman Project Holdings Limited, Boksburg, South Africa

[21] Appl. No.: 908,249

[22] Filed: Jun. 26, 1992

[30] Foreign Application Priority Data

Jun. 27, 1991 [ZA] South Africa ............... 91/4976

[51] Int. Cl.⁶ .................................................. C02F 9/00
[52] U.S. Cl. ................................. 210/257.1; 210/319; 210/134; 210/142; 209/269; 209/354; 266/235
[58] Field of Search ............ 210/787, 790, 800, 195.1, 210/319, 257.1, 684, 258, 134, 142, 236; 209/17, 397, 275, 269, 354

[56] References Cited

U.S. PATENT DOCUMENTS

| | | | |
|---|---|---|---|
| 2,155,764 | 4/1939 | Lisauer | 210/319 |
| 4,042,228 | 8/1977 | Ward et al. | 266/235 |
| 4,073,481 | 2/1978 | Lawson et al. | 266/235 |
| 4,416,774 | 11/1983 | Taylor | 210/236 |
| 4,981,598 | 1/1991 | Komadina | 210/684 |

*Primary Examiner*—Robert A. Dawson
*Assistant Examiner*—Ana M. Fortuna
*Attorney, Agent, or Firm*—Harness, Dickey & Pierce

[57] ABSTRACT

The invention relates to an apparatus in the form of a multi-cell installation, and a method for the recovery of metal values from a liquid medium 16 in the form of a pulp or leach solution in which a continuous supply of a liquid medium 16 is continuously brought into reactive contact with a high concentration of a particulate material 17, and in which the particulate material is continuously separated from the liquid medium. The installation comprises a plurality of vessels 10, 12 for the liquid medium independently driven agitation means 34 for maintaining particulate material 17 in suspension; a screen 22 arranged at an angle to the horizontal and located above the liquid level; and an axial flow impeller 26 for causing an upward flow of the liquid medium 16 to the screen 22.

9 Claims, 22 Drawing Sheets

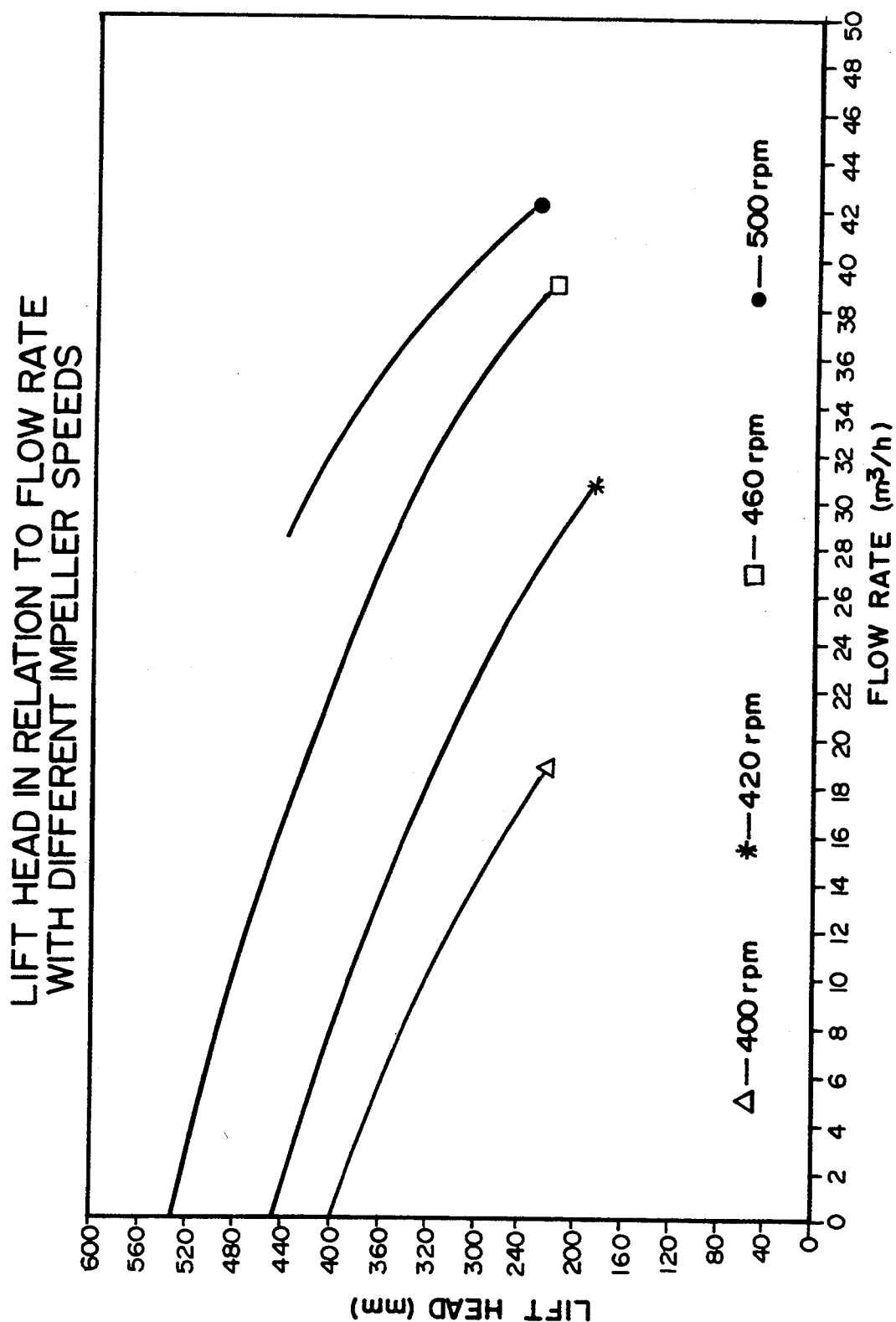

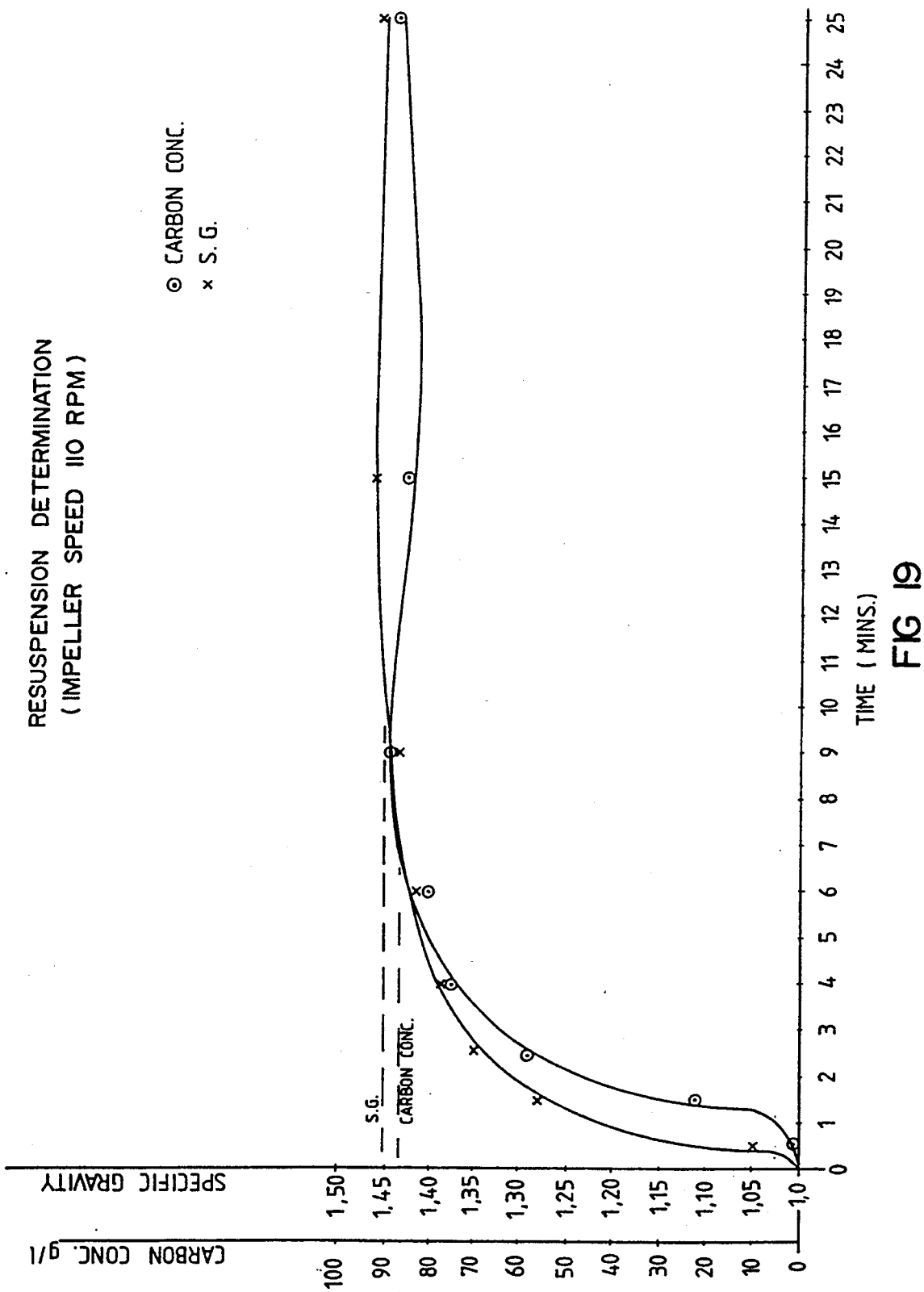

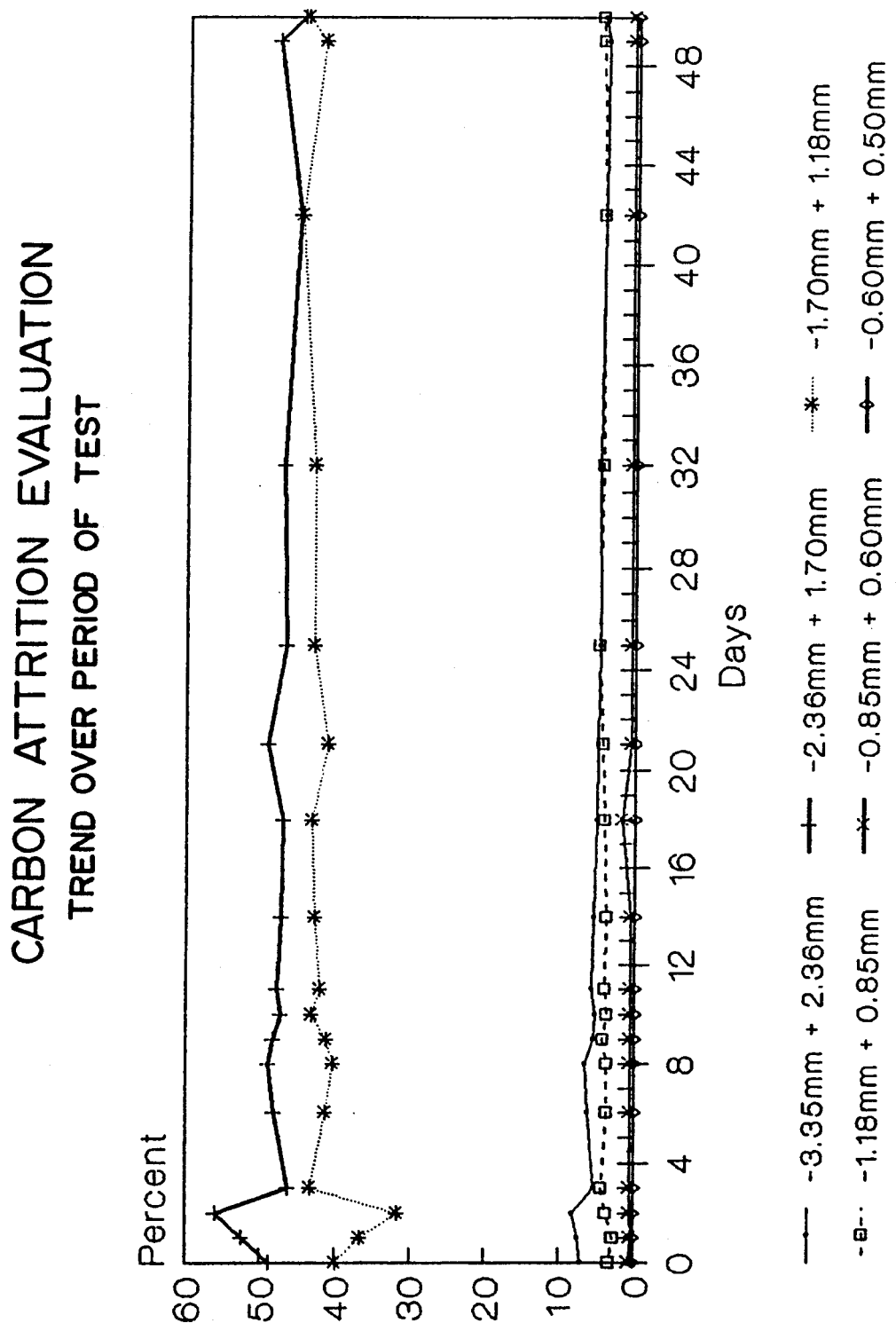

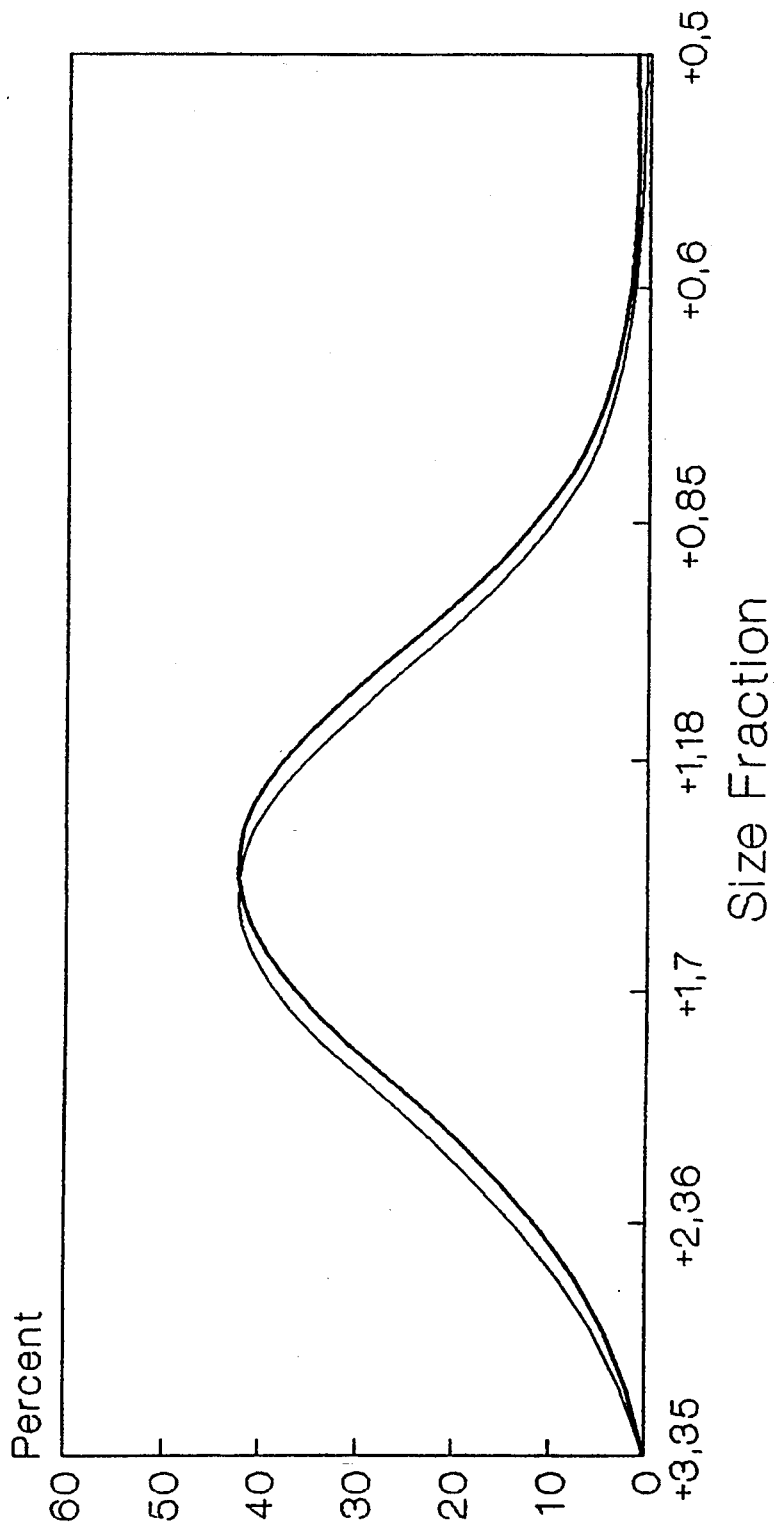

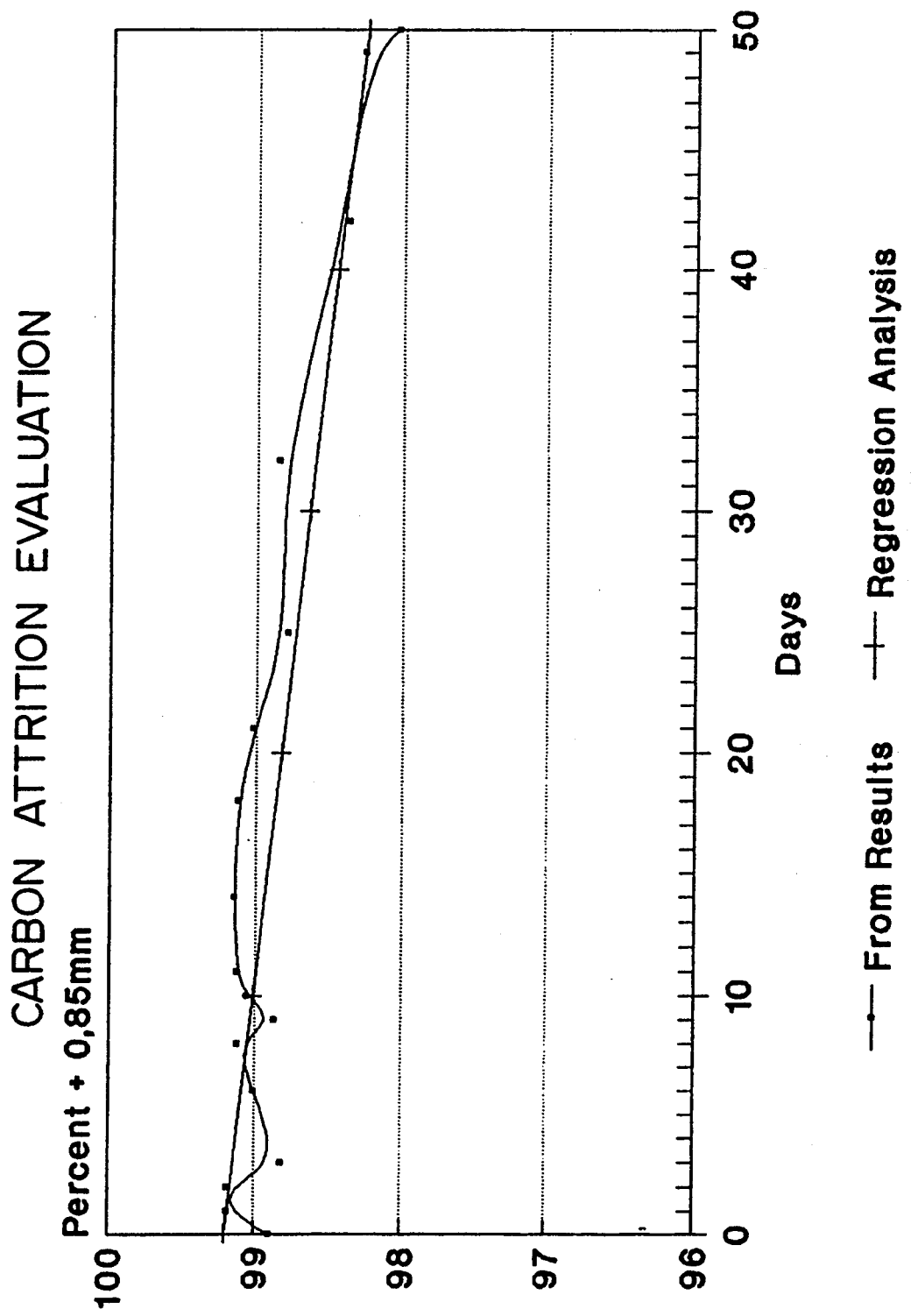

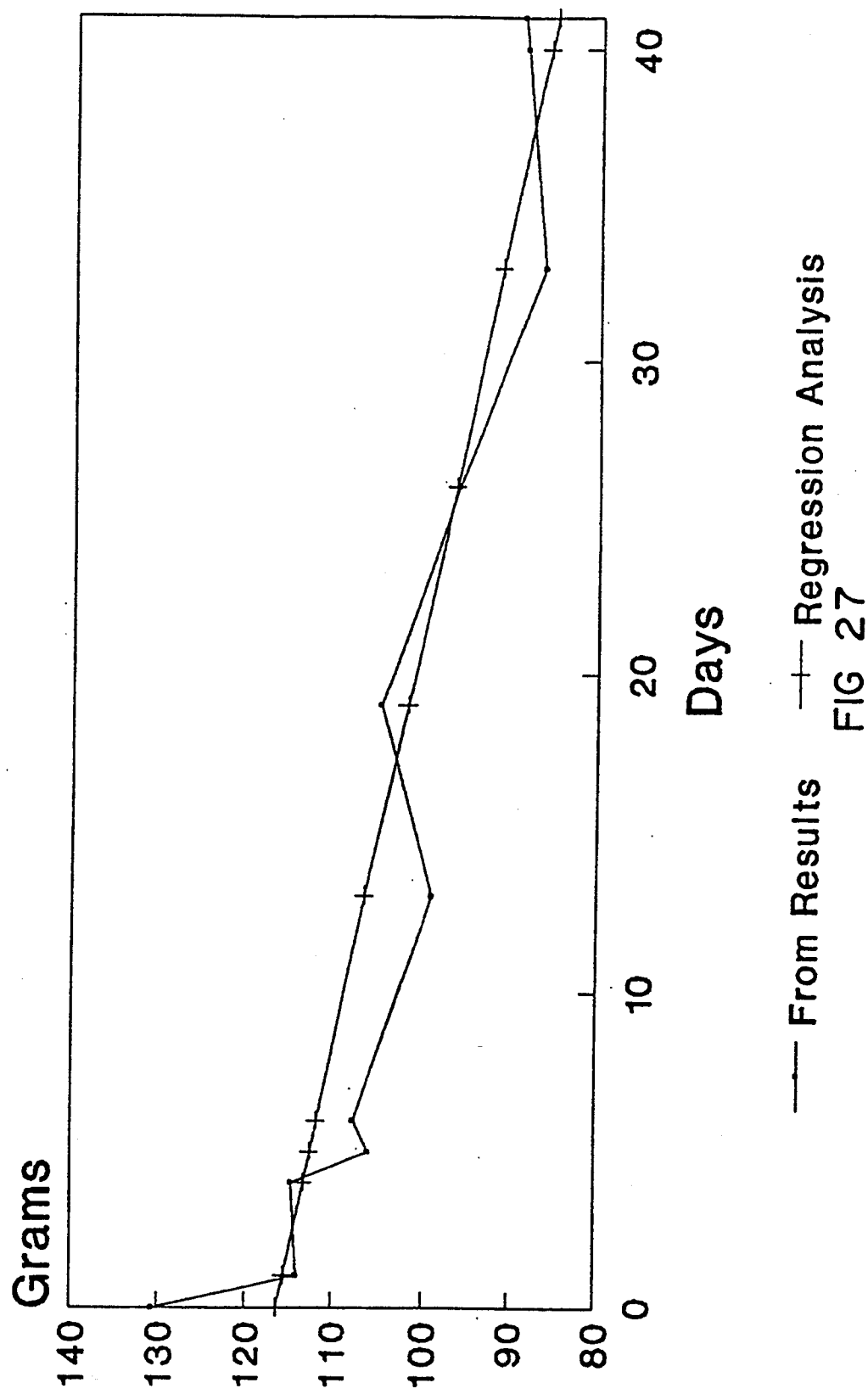

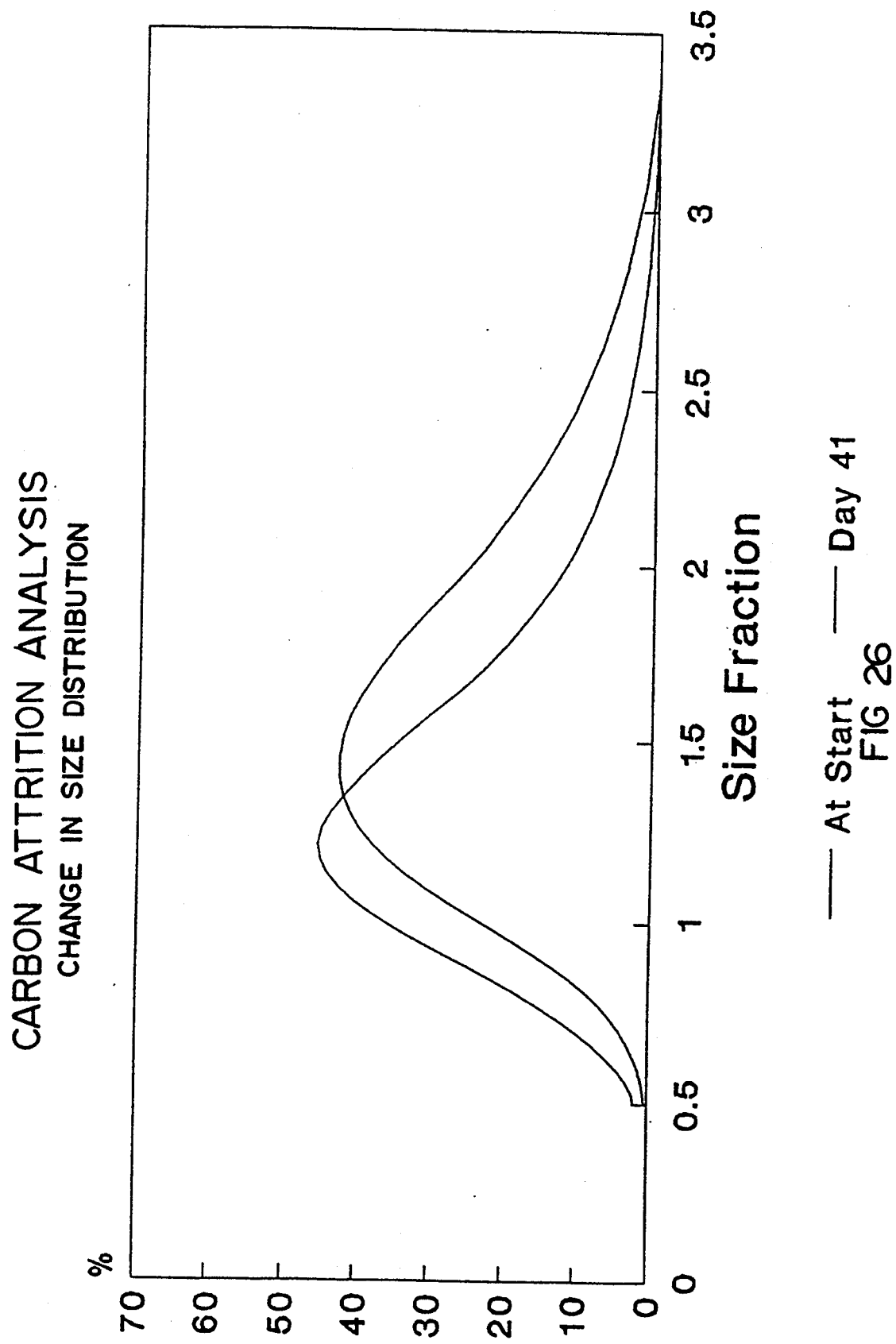

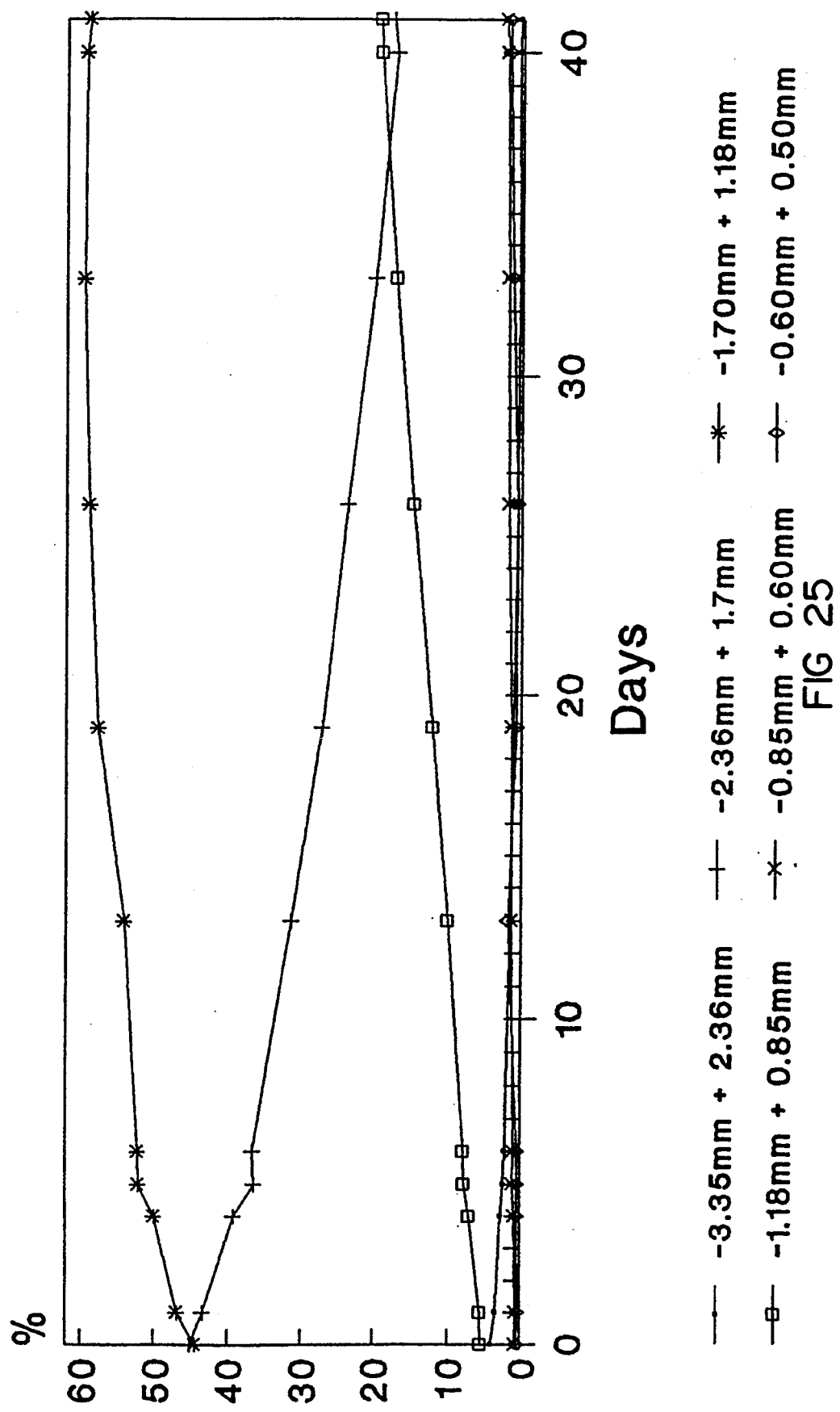

APPARATUS FOR SEPARATING PARTICULATE MATERIAL FROM A LIQUID MEDIUM

THIS INVENTION relates in general to an apparatus for the separation of particulate materials from a liquid medium such as a pulp or a leach solution in which the particles are suspended, and to a method for such separation with the aid of the apparatus.

More particularly the invention relates to an apparatus, advantageously in the form of a multi-cell installation, in which a continuous supply of a liquid medium is continuously brought into reactive contact with a high concentration of a particulate material, and in which the particulate material is continuously separated from the liquid medium.

In a particular application the invention relates to an apparatus for the recovery of metal values from a liquid medium in the form of a pulp or leach solution by a carbon-in-pulp, carbon-in-leach, resin-in-pulp or resin-in-leach adsorption or absorption procedure, in which a high concentration of carbon or resin adsorbent particles is employed, and to a method of recovering metal values with the aid of such an apparatus. The apparatus may thus be an apparatus for continuously contacting solubilised metal values in a pulp or solution with a high concentration of particulate adsorbents and for continuously separating the particulate adsorbents from the pulp or solution.

With escalating costs for producing metals such as gold and other valuable metals from mined ore, concerted efforts are being made in industry to improve the efficiencies of the recovery processes and to lower the capital and operating costs, and particularly to provide improved methods and installations for achieving substantially complete recovery of metal values in solution in ore pulps and slurries and in leach solutions.

Carbon-in-pulp (CIP), carbon-in-leach (CIL), resin-in-pulp (RIP) and resin-in-leach (RIL) recovery procedures are known. All of these procedures operate on accepted adsorbent loading kinetics and equilibrium principles, in terms of one aspect of which the rate of metal loading on to the adsorbent particles is directly related to the metal concentration differential between the solution and the adsorbent particles. In a CIP or CIL recovery plant for the recovery of gold (Au) in solution, for example, it would thus be advantageous in order to maintain optimum Au-C loading kinetics, to separate a solution which has become partially gold-depleted from carbon particles which have become partially loaded with gold, and to bring that partially depleted solution into contact with lean carbon particles, and the partially loaded particles into contact with a gold-rich solution. Thereby a gold concentration differential will be attained, favouring the loading of gold from the solution on to the carbon particles. One way of achieving this is to move the separated carbon particles in counter-current fashion relative to the liquid medium. The Applicants propose to achieve this in a different manner.

According to another aspect of the underlying loading kinetics principles, increased metal transfer will take place with higher concentration of adsorbent, eg carbon particles. However, serious problems are encountered with conventional installations when the concentration of adsorbent particles is increased above a certain level, such as choking of the separation screen, and increased attrition and resultant loss of adsorbent particles.

Another problem that is encountered with certain conventional systems, is related to inadequate hydraulic flow performance achieved in such systems, in that it is difficult in these systems for a sufficient hydraulic head to be achieved to enable satisfactory gravity flow through the system without the assistance of external pumping means. These and other aspects will be reverted to more fully further below.

The Applicants have developed an installation with which many of the desirable objectives may be achieved, while many of the undesirable consequences may be avoided.

According to the invention there is provided a multi-cell apparatus for maintaining a particulate material in suspension in a liquid medium and for continuously separating the particulate material from the liquid medium in which the particles are suspended, which includes a plurality of vessels for the liquid medium, a vessel having an inlet to charge liquid medium into the vessel to a predetermined level and an outlet;

independently driven agitation means provided in a vessel for maintaining particulate material in the vessel in suspension in the liquid medium;

a screen provided in respect of a vessel, arranged at an angle to the horizontal and with at least its upper area located above the said level;

means for causing an upward flow of a portion of the liquid medium in a vessel with suspended particles to a level at least as high as the upper area of the screen, and for continuously discharging that liquid medium with suspended particles onto the upper area of the screen, thereby causing liquid medium and particles to flow under gravity down the screen, with the liquid passing through the screen and the particles being retained on the screen and optionally returned to the vessel;

collecting means for collecting screened liquid medium having passed through the screen and conveying it to the outlet; and conduit means for feeding the collected liquid medium from the outlet to the inlet of a succeeding vessel at least partially under force of gravity.

The suspended particles may be solid adsorbent or absorbent particles or granules, such as carbon or resin granules. The liquid medium may be a pulp or a leach solution containing gold or other valuable metals in solution.

The apparatus according to the invention is thus particularly suitable to be used for the recovery of metal values from a pulp or leach solution in which carbon particles or resin particles are suspended, as in carbon-in-pulp, carbon-in-leach, resin-in-pulp or resin-in-leach adsorption or absorption processes. As the solubilised metal is removed from the pulp or leach solution in a vessel so that it becomes metal-depleted, it is passed to the next succeeding vessel where it is brought into contact with absorbent particles on which less metal has been loaded, so that further metal loading may take place. For example, where the apparatus is used for the recovery of solubilised gold from a gold-bearing cyanide leach solution, a metal-laden leach solution may be charged into a first vessel, where the solution comes into contact with carbon or resin particles present in the vessel. Metal is adsorbed onto the carbon or resin particles, which are retained in the vessel, and the partially metal-depleted leach solution is passed to the next vessel for further removal of soluble metal values by lean carbon or resin particles. Fresh metal-rich leach solution is charged into the first vessel, and further adsorption on the already partially loaded carbon or resin particles takes place. This process is repeated with successive vessels, until the leach solution is totally depleted of solubilised metal, and at least the carbon or resin particles in the first vessel are fully loaded with metal. The fully metal-laden carbon or resin particles are ultimately collected and removed from the first vessel for further processing to recover the metal.

The invention extends also to a method for maintaining a particulate material in suspension in a liquid medium and continuously separating the particulate material from the liquid medium in which the particles are suspended, which includes the steps of charging a liquid medium successively into a plurality of vessels containing particulate material such that the liquid medium in a vessel extends up to a predetermined level;

agitating the liquid medium and particulate material to maintain the particulate material in suspension in the liquid medium;

causing an upward flow of a portion of the liquid medium with suspended particles to a screen located above the said level and arranged at an angle to the horizontal;

continuously discharging the lifted liquid medium with suspended particles onto the upper area of the screen and allowing the liquid with suspended particles to flow continuously down the screen under gravity, so that liquid passes through the screen and particles are retained on the screen; and collecting either screened liquid or screened particles or both at the lower end of the screen.

The method according to the invention, for the same reasons as apply to the installation of the invention, is also particularly suitable to be used for the recovery of metal values from a pulp or leach solution in which carbon or resin particles are suspended to act as adsorbents or absorbents. In that case the solution to be charged successively into the different vessels, may be a metal-laden pulp or leach solution, and each vessel may be provided with carbon or resin particles to act as adsorbers or absorbers. In each successive vessel the solution will be further depleted of metal, while the carbon or resin particles will become progressively more loaded with metal. The metal-laden carbon or resin particles may ultimately be collected and removed for further processing.

In order to ensure that the particles are maintained in suspension, and that good contact between the metal in the solution and the adsorbent particles is achieved, the solution or pulp may continuously be agitated, eg by means of an impeller provided in each vessel.

The description that follows apply equally to the installation according to the invention, and the method according to the invention.

It will be evident that the successful execution of the aforesaid metal recovery procedure depends inter alia on effective interstage screening of the liquid medium containing the adsorbent particles after each vessel, to separate the liquid phase from the solid particles prior to passing it to the next succeeding vessel.

Effective interstage screening is not always achieved with known installations. For example, known CIP and CIL recovery processes operate with carbon particle concentrations of between about 5–30 g C/l of pulp or leach solution. When this concentration is increased, in order to achieve accelerated metal loading of the carbon particles in accordance with the loading kinetics principles set out above, for example to about 60–80 g C/l, two problems are generally encountered. In the first place, choking or blinding of the conventional interstage screening devices occurs; and secondly, increased attrition of the carbon particles, with attendant increased carbon losses occur.

In known installations, the interstage screening devices are generally wedge wire or woven wire mesh screens provided submerged in the liquid medium in a position between the inlet and the outlet of the vessel. Because of the clogging and choking which occur with increased carbon concentration and/or increased liquid flow rates, screen cleaning means such as air bubbles or wiper blades have to be provided to sweep the screen cloth so as to remove deposited carbon particles. Such devices are not very successful. Furthermore, since the screening devices are generally submerged within the liquid, the cleaning and maintenance of such screens present difficulty in practice; it is usually necessary for the relevant vessel to be taken off line and sometimes to be drained, and/or for the screens to be removed entirely and subsequently replaced.

Furthermore, since the screening devices are generally provided between the inlet and outlet of the vessel, liquid flow through the screen cloth is retarded, and it may be difficult to create sufficient hydraulic heads to ensure good interstage flow of liquid where the treatment vessels are all provided on the same level. With the elevated screen function of the Applicants design, and the attendant lift head of liquid provided, an adequate hydraulic head may be created to ensure effective interstage flow, even where the treatment vessels are located on the same level.

In providing a multi-cell CIP or CIL recovery installation capable of operating with optimum results, it is necessary to address the problems relating to carbon breakdown and attendant high carbon losses; screen performance and undesirable screen clogging and choking; hydraulic flow, and particularly the requirement to handle high flow rates and maintain acceptable interstage flow rates even with tanks provided on the same level; slurry settlement and efficient agitation to maintain carbon particles in suspension without causing unacceptable attrition; sufficiently high carbon concentration to ensure efficient metal transfer; and generally the applicable loading kinetics principles should be observed to ensure optimum metal transfer from the liquid medium to the absorbent particles.

The Applicants have found that all of these aspects may successfully be addressed by the provision of an installation according to the invention. For instance, a metal recovery procedure may be carried out with such an installation employing a carbon particle concentration as high as about 80–120 g C/l of pulp or leach, preferably about 100 g C/l. Because the Applicants provide the screening device in an elevated and slanted position above the level of the liquid medium, clogging or blocking of the screen cloth is prevented or at least reduced, and cleaning and general maintenance and visual inspection of the screen are facilitated. A portion of the liquid medium in a vessel is continuously lifted up to and deposited on the elevated and slanted screen, and is allowed to run down the screen under gravity. Because the liquid medium with suspended carbon particles is not formed through the screen cloth under excessive pressure, clogging or blocking of the screen is avoided or at least reduced, and at the same time attrition of the carbon particles is reduced.

Furthermore, because the liquid medium is lifted prior to screening, an adequate hydraulic head is created, providing good interstage liquid flow under gravity, even with treatment vessels provided on the same level.

Efficient separation of the adsorbent particles from the liquid medium is achieved in accordance with the invention by passing the liquid medium over the elevated and slanted screen device situated above the level of the liquid medium, so that the adsorbent particles will be retained on the screen and washed back into the same vessel by the excess flow of liquid over the screen. The low hydrostatic head of liquid on the screen will minimise screen blockages which frequently occur in other screening devices provided submerged in the liquid medium. The liquid passing through the screen is collected by the collection means, and passed to the next succeeding vessel.

A distinctive feature of the installation according to the invention is that the liquid lift and screening function is separated from the agitation function in the processing vessel. This has the important advantage that each function may individually be optimised, independently of the other, to satisfy the requirements of different circumstances. For example, when the particulate absorbent material is resin, gentle and mild agitation is required due to the specific characteristics of the resin. On the other hand, with carbon particles agitation requirements are different: because carbon is heavier than resin, more intense agitation is required to keep the carbon particles in suspension.

The means for causing an upward flow of the liquid medium onto the elevated screen may comprise an open-ended lift pipe mounted substantially upright in the vessel, with its lower and submerged in the liquid medium and its upper end extending above the aforesaid level of the liquid medium, an axial flow impeller provided within the pipe, and the slanted screen being provided at the upper end of the pipe. It should be understood that the axial flow impeller provided to lift the liquid medium to the elevated screen, is driven independently of the agitator impeller, for the reasons referred to above. The submergence, rotational speed and blade configuration and profile of the lift impeller will in practice be selected to achieve the desired lift head of the liquid medium, to enable the lifted liquid to be delivered to the upper area of the screen. On the other hand, the submergence, rotational speed and blade configuration and profile of the agitator impeller will be selected independently to optimise mixing and suspension of the particulate material.

The screen may advantageously be of frusto-conical configuration, with its narrow opening arranged around the upper end of the lift pipe, and so that the screen slants downwardly and outwardly from the upper end of the lift pipe. The arrangement is preferably such that the entire screen is situated above the aforesaid level of the liquid medium in the vessel. A screen of frusto-conical configuration has practical advantages, such as that a maximum screen area is provided with a minimum size.

Instead of a screen of frusto-conical configuration, a slanted screen of any other suitable shape or configuration may be provided. For example, the screen may be of substantially rectangular shape, or of trapezoidal shape, arranged at a suitable angle to the horizontal to present a slanted, downwardly sloping screening surface.

The angle of the screen to the horizontal should be selected to achieve effective screening of the liquid phase and to ensure that the flow of excess liquid over the sloping screen surface will be sufficient to wash down adsorbent particles to permit them to fall back into the vessel, but not so excessive as to impair the efficiency of the screening function. It has been found that a screen angle of about 15°–45° to the horizontal gave good results in practice. It is also evident that the selection of suitable screen apertures and screen cloth material would have a bearing on the overall efficacy of the system. Furthermore, although the volume of liquid medium lifted up to the screen should be sufficient to provide a moderate excess of liquid to flow down the screen so as to wash down adsorbent particles caught on the screen, the excess flow should not be excessive. An excessive flow of liquid down the screen will contribute in causing attrition losses of carbon. All of these aspects will be referred to in more detail further below.

The frusto-conical or otherwise configured screen may be comprised of a plurality of separate screen panels, mounted on a suitable support structure. The panels may conveniently be provided with readily releasable clip-on or similar securing means, whereby individual panels may readily be inspected, removed and replaced.

As mentioned before, it is of particular advantage to have the screen located above the level of the liquid medium. Visual inspection of the screen is made easy, and so also the cleaning and servicing thereof. Replacement of individual panels can readily be effected. Because the slanted screen is continuously washed by the flow of liquid over it, it is less prone to blocking or clogging.

The latter feature of the elevated and slanted screen, namely that it is less prone to blocking or clogging, in an important feature in practice. Because of the effective screening achieved with such a screen, and because the screen is less prone to clogging or blocking, it becomes possible for considerably higher concentrations of adsorbent particles to be used, e.g. up to about 80–120 g C/l of liquid medium. This in turn makes it possible for smaller treatment vessels to be employed since comparable rates of metal transfer may be achieved with the higher adsorbent concentration. In fact, it becomes possible for banks or clusters of treatment vessels to be provided the total size of which makes them suitable to be transported by road or rail conveyors. These smaller scale installations will bring about savings in capital and operational costs.

Because higher concentrations of adsorbent particles can be used, with a consequential increase in metal transfer rate, the residence time of a liquid medium in a particular vessel may be reduced. It has been found by the Applicants that the conventional residence time of about 1 hour of a liquid medium in a vessel with a carbon particle concentration of about 25 g C/l, may be reduced to a residence time of about 15 minutes when a carbon particle concentration of about 100 g C/l is used.

Furthermore, because treatment vessels of smaller volumes allow improved mixing efficiency, as a result of which better contact between the adsorbent particles and the solubilised metal values can be achieved with the attendant improved metal loading kinetics, it becomes possible to reduce the residence time of the liquid in a vessel still more, namely to about 8 minutes. It will be appreciated that this constitutes an important practical advantage, and represents a saving in costs.

A further advantage of the installation, resulting from the higher hydraulic lift achieved with the elevated screening function, is that improved hydraulic flow through the installation may be achieved, thus enabling the different vessels to be placed on the same level without reducing the necessary interstage flow rate. This feature involves a cost advantage, related to the simplified constructional features.

Another advantage that may be achieved with an elevated screen in accordance with the invention, is that sudden increased flow rates can be handled effectively without causing hydraulic pinning of the carbon onto the screen surface. It will be appreciated that an increased flow rate of liquid medium into a vessel will require an increase in the screening rate and the collection and removal of screened liquid, so as to maintain the liquid level in that vessel at the predetermined level. The screen size will be relevant in achieving the desired screening rate as well as the pump rate achieved by the impeller in the lift pipe. The Applicants have found that with a metal screen (apertures 0,8 mm, wire 0,46 mm) of 0,1 $m^2$ screen area, a liquid flow rate of about 35–40 $m^3/h$ with particle concentration of 108 g C/l could effectively be screened with the aid of a lift impeller with rotational speeds between about 400–500 rpm and a lift head of about 200 mm. Acceptable flow rates could be achieved with a lift head up to about 400 mm.

Instead of an impeller, the upward flow of the liquid medium in the lift pipe may be effected by air lift means. In this case, the lower end of the open-ended pipe may be positioned in close proximity to the bottom of the vessel, and an air pipe may be arranged to blow air under pressure into the pipe, to cause liquid to rise in the pipe with the air bubbles. Since the body of liquid rising with the entrained air bubbles will be of lower density than the rest of the liquid solution, the liquid in the pipe will be forced upwardly by the pressure exerted by the unaerated slurry in the tank.

It is also possible to lift the liquid medium in an external conduit, e.g. in a suitable external flow conduit leading to the upper region of the screen. In that case, the lifting means may be a pump, air lift means, or one or more impellers provided in the external conduit.

The collection means for collecting screened liquid may comprise a collection trough or gutter provided below the screen, and leading into a launder or conduit which constitutes the outlet from the vessel and in turn leads to a subsequent vessel. The liquid head generated in the lift pipe not only causes improved flow of solution over the slanted screen, but also imparts as a result of gravity, improved flow rates of the liquid collected in the trough through the launder to the next vessel. The various vessels may thus be provided on the same level and satisfactory interstage flow rates may still be achieved.

As indicated before, the adsorbent particles will usually be washed down the screen face to fall back into the vessel, where the particles will be brought into suspension again by the agitator means for continued metal transfer.

If desired, collection means may also be provided for collecting the particulate carbon or resin adsorbent, comprising a collection trough or gutter provided at the discharge end of the screen from where the particles may be transferred to another vessel or treatment apparatus for recovery of the adsorbed metal values.

It has been found preferable in practice to provide an independently driven agitator in a vessel, to maintain the liquid medium in a state of mild agitation, thereby to keep the adsorbent particles in suspension, and to ensure continuous contact between the adsorbent particles and the dissolved metal. Such an agitator may be particularly useful where a vessel of substantial volume is operated.

The agitator may preferably be a variable speed drive impeller having two or more blade systems arranged in vertically spaced relationship. The blades are preferably of hydrofoil design and of such shape and arrangement that the bottom blade system will have a down-pumping action and the upper blade system an up-pumping action. In this manner efficient mixing of the particulate material and the liquid medium is achieved, so that the particles are placed and maintained in suspension in the liquid medium, while lower rotational speeds and lower power consumption will be required. Resuspension tests conducted with a dual blade impeller after the solid particles were allowed to settle for 16 hours, showed that full suspension was achieved in 9 minutes. This aspect will be reverted to in more detail further below.

With a dual blade agitator the movement in the liquid medium was found to be effective yet gentle, and attrition of the carbon particles was reduced. This aspect will also be reverted to below.

The installation according to the invention may comprise a plurality of vessels arranged in banked or cluster formation, with the collecting launder or trough of one vessel discharging screened liquid into the adjacent vessel. The vessels may thus be interconnected for series flow.

In practice, a multi-cell installation according to the invention may be operated by arranging the flow of liquid medium between the various vessels in the following manner: In an installation of say eight treatment vessels, a slurry to be treated for the recovery of dissolved metal values may be fed from a supply of such slurry to the first vessel (i.e. the feed vessel) a from there in series to each successive vessel. It will be understood that each treatment vessel will have been set up in accordance with the invention with an agitator, an elevated screen with lift means for the slurry, and a collecting means for collecting screened slurry and delivering such screened slurry to the next succeeding vessel, and each vessel will further contain a suitable quantity of carbon or other absorbent particles. When the slurry reaches the eighth vessel, the slurry will be substantially depleted of dissolved metal, and the screened slurry is delivered to a recovery vessel or tundish where it is passed through a safety catch screen to recovery any carbon particles which may be present in the slurry, whereupon the depleted slurry is discarded as tailings.

In the meanwhile the carbon-particles in the first vessel, i.e. the feed vessel, will have become fully loaded with metal, and that vessel is then taken off line and by-passed, and the supply of fresh slurry is moved to the second vessel, which then becomes the feed vessel. It will be appreciated that the carbon particles in said second vessel will now be exposed to a metal-rich slurry, with increased metal loading potential. The contents of the by-passed vessel is drained into a carbon recovery vessel, where the fully loaded carbon particles are removed for further processing and recovery of the metal; and the separated liquid phase is returned to the treatment line, i.e. to the second or feed vessel. The drained first vessel is then again brought on line: it is charged with fresh lean carbon particles, and the screened slurry from vessel number eight (i.e. substantially depleted slurry) is delivered to said first vessel for final metal loading on the fresh carbon, after which the totally depleted slurry is delivered to the recovery vessel or tundish, where it is passed through the safety catch screen before being discarded as tailings.

In the meanwhile the carbon in the second vessel will have become fully loaded, so that the second vessel is taken off line to be drained, while the supply of fresh slurry is moved to the third vessel, which then becomes the feed vessel. In this manner the supply of fresh slurry is rotated cyclically, and depleted slurry as well as loaded carbon are removed cyclically, to achieve optimum removal of metal values.

In one embodiment, individual vessels may be of rectangular cross-sectional shape, and banked or cluster arrangements of such rectangular vessels may be provided as modules. Such modules may be designed to be portable, e.g. to be suitable for road transport. Thus installations may for example be provided in four-vessel units to handle smaller tonnages, while larger eight-vessel units may be provided for larger installations.

In another embodiment, the vessels may be arranged for a so-called carousel feeding arrangement, with individual vessels being arranged in a circular or other suitable configuration. Again the collecting launder or trough of one vessel may be arranged to discharge its screened liquid to the next succeeding vessel. Centrally within a circular configuration of vessels, a recovery vessel or tundish may be provided, with outlet pipes from the individual vessels leading into the recovery vessel or tundish. A particular vessel may also have a drain outlet, and may be taken off line to be drained when its carbon particles are fully loaded, and the contents of that vessel may be further processed for the separation of the loaded particles from the liquid phase. The liquid phase may be returned to the processing line, and the separated metal-laden particles may be further processed for recovery of the metal values.

In a particular embodiment, individual vessels of a carousel formation may be of hexagonal or polygonal cross-sectional shape, so that adjacent vessels will have communal walls. The central recovery vessel may likewise be of hexagonal shape, and its walls may be formed by the walls of the surrounding vessels, in honeycomb configuration.

The invention and the manner in which it may be put into practice will now be described by way of example, with reference to the accompanying diagrammatic drawings.

BRIEF DESCRIPTION OF DRAWINGS

FIG. 18 is a graphic representation of the lift head achieved with different impeller speeds, plotted against liquid feed flow rate;

FIG. 19 is a graphic representation of carbon suspension tests, showing carbon concentration in and specific gravity of the liquid medium with an agitator rotational speed of 110 rpm, plotted against time;

FIG. 20 is a graphic representation of a carbon attrition evaluation, showing percentage of different carbon particle sizes plotted against time, as a function of agitator operation only;

FIG. 21 is a different graphic representation of a carbon attrition evaluation, showing the shift in carbon particle size distribution at the beginning and at the completion of the test, again as a function of agitator operation only;

FIG. 22 is yet another graphic representation of a carbon attrition evaluation, showing the decrease in percentage particles having a particle size greater than 0,85 mm, plotted against time, again as a function of agitator operation only;

FIG. 25 is a graphic representation of a carbon attrition evaluation, showing carbon particle size distribution, as a function of the operation of both the agitator and the screening lift means;

FIG. 26 is another graphic representation of a carbon attrition analysis, showing the shift in particle size distribution between the start of the test and day 41, again as a function of the operation of both the agitator and the screening lift means; and FIG. 27 is a graphic representation of the carbon loss over time, again as a function of the operation of both the agitator and the screening lift means.

DETAILED DESCRIPTION OF DRAWINGS

Figure 1:
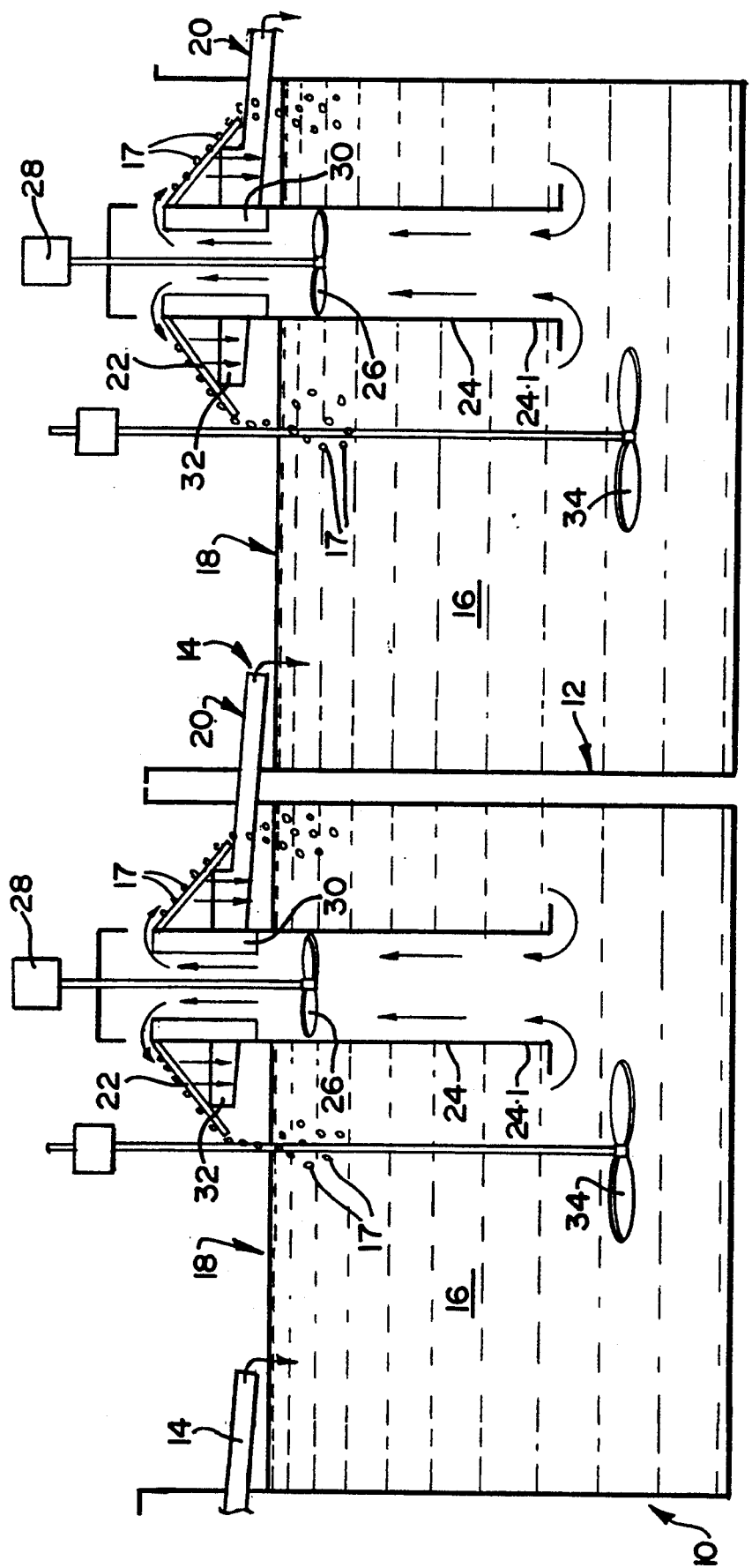
FIG. 1 represents diagrammatically two vessels of an installation according to the invention, which is suitable for recovering metal values from a pulp or leach solution with the aid of a carbon or resin adsorbent.

Referring to FIG. 1 of the drawings, an installation according to the invention for recovering metal values from a liquid medium 16 which may be a pulp or leach solution in which carbon or resin particles 17 are suspended, comprises a plurality of vessels of which two are shown, indicated as 10 and 12. Each vessel has an inlet 14 to charge a liquid medium 16 having metal values dissolved therein, into the vessel up to a predetermined level 18. It will be observed that the vessels 10, 12 are connected for series flow in that the outlet 20 of vessel 10 becomes the inlet 14 of vessel 12.

Each vessel 10, 12 is provided with a screen 22 of frusto-conical shape, mounted on the upper end of an upright lift pipe 24 in such a manner that the screen is located above the level 18 of the liquid medium 16. The screen 22 is arranged at an angle to the horizontal, and is made of a suitable mesh material or wedge wire.

The upright pipe 24 is mounted with its lower end 24.1 submerged in the liquid medium 16, and its upper end, where the screen 22 is mounted, extending above the level 18 of the liquid medium 16. An axial flow impeller 26 is provided within the pipe 24, the impeller being driven by a motor 28. Guide vanes 30 are provided in the upper region of the pipe 24.

Below the slanted screen 22 a collecting trough 32 is provided, which leads into an outlet launder or conduit 20. A further agitator 34 is provided to keep the liquid medium 16 in motion, so as to keep the carbon or resin particles 17 in suspension and to ensure that continuous contact is made between the carbon or resin adsorbent particles 17 and the metal dissolved in the liquid medium 16.

In use, a liquid medium 16, e.g. in the form of a pulp or leach solution and having metal values dissolved therein, is charged into the vessel 10 through inlet 14, up to the level 18. Adsorbent granules, for example in the form of carbon particles or granules 17, are present in the vessels 10, 12. The agitator 34 will maintain the liquid medium 16 in a constant state of agitation, to keep the adsorbent granules 17 in suspension and to enhance adsorption of the dissolved metal onto the granules 17.

The lift impeller 26 within the upright pipe 24 causes an upward flow of the liquid medium 16 with the suspended particles 17 within the pipe 24, to its upper end located above the upper region of the screen 22. There the liquid with suspended particles is discharged onto the upper regions of the slanted and conical screen 22, and is allowed to flow, under gravity, over the screen surface. Adsorbent particles 17, partly laden with adsorbed metal, will be retained on the screen, while the liquid 16, now partly depleted of dissolved metal, will pass through the screen, to be collected in a collection trough 32 provided below the screen 22. From here the liquid will flow into the launder or conduit 20, which leads to the second vessel 12 as its charge inlet 14.

The partly laden carbon particles 17 retained on the screen 22 in the vessel 10 will fall back into the liquid medium 16, which will in the meanwhile have been replenished by fresh solution or pulp through inlet 14. The partly-laden carbon particles 17 will continue to adsorb metal values from the liquid medium 16, until they are fully laden, when they will be removed for further processing.

In the second vessel 12, the adsorption and separation procedure is continued.

Figure 2:
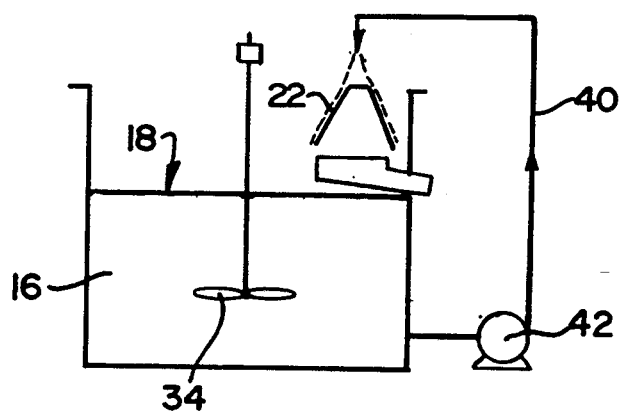
FIGS. 2, 3 and 4 are schematic representations of alternative lift means for lifting the solution or pulp onto the screen device.
Figure 3:
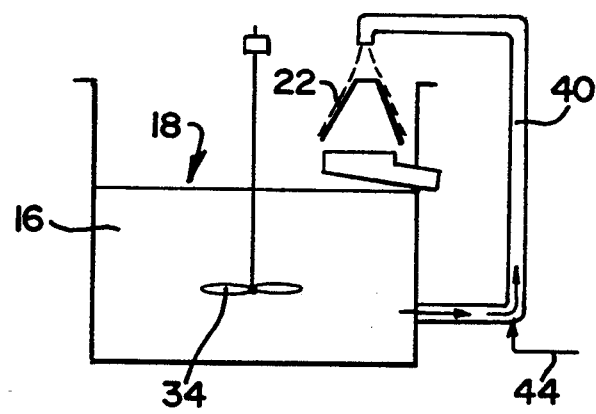
Figure 4:
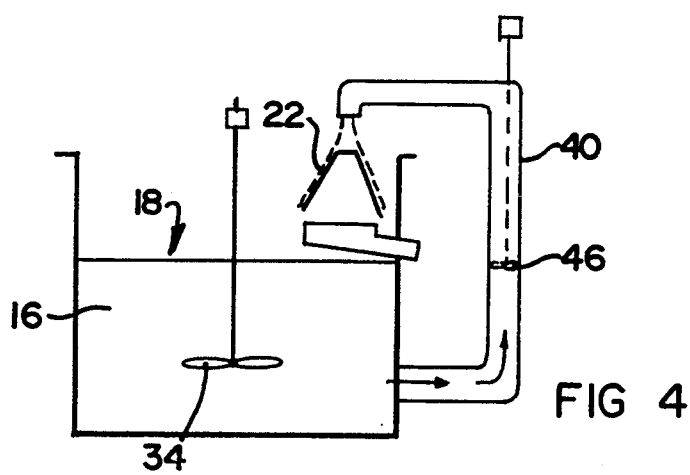

Referring now to FIGS. 2, 3 and 4, it is shown that alternative means may be provided for lifting the liquid medium 16 onto the screen surface 22. For example, the liquid medium 16 may be lifted by way of an external conduit 40, and flow of the liquid through such conduit may be brought about by a pump 42, as shown in FIG. 2; or by an air lift, with compressed air being introduced as shown at 44 in FIG. 3; or by one or more impellers 46 provided in the conduit 40, as shown in FIG. 4.

Figure 5:
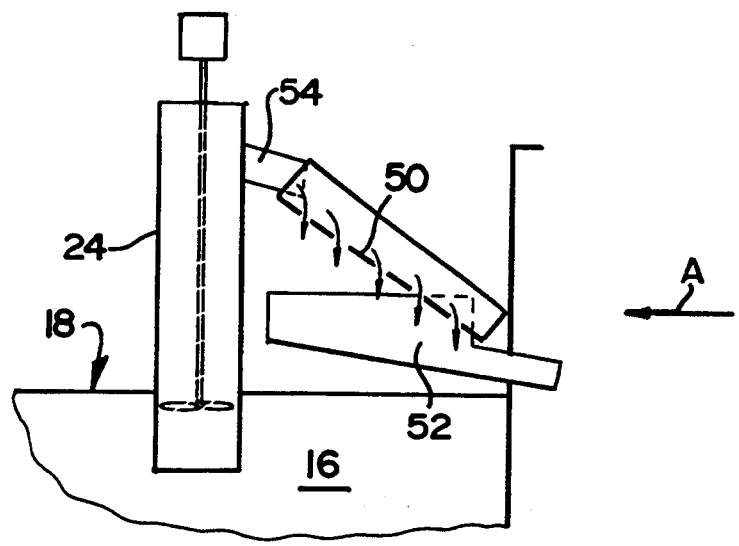
FIG. 5 is a schematic side view of an alternative screen lay-out, depicting a slanted screen of different configuration.
Figure 6:
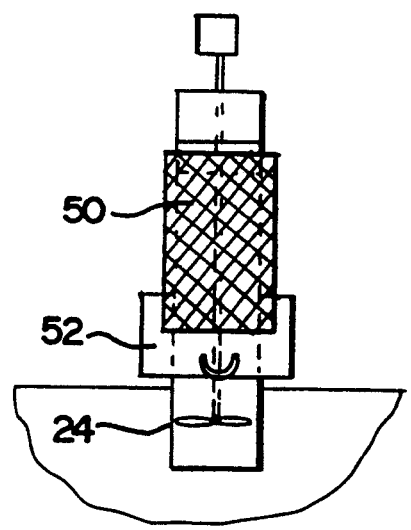
FIG. 6 is also a schematic representation of the lay-out of FIG. 5 but viewed in the direction of the arrow A in FIG. 5.

Although it has been found that a frusto-conical screen device as depicted in FIG. 1 functions very efficiently and provides maximum screen area for the minimum space, it should be understood that alternative screen lay-outs may be used, as long as the screen surface is provided at an angle to the horizontal, to slope downwardly so as to promote flow of the solution or pulp with suspended adsorbent particles over the screen surface under force of gravity. As shown schematically in FIGS. 5 and 6, a screen 50 of rectangular configuration may be arranged at or near the upper end of the upright pipe 24, to slope downwardly to a collecting trough or launder 52. The upright pipe 24 may then have an outlet 54 for discharging solution or pulp onto the upper region of the slanted screen 50.

Figure 7:
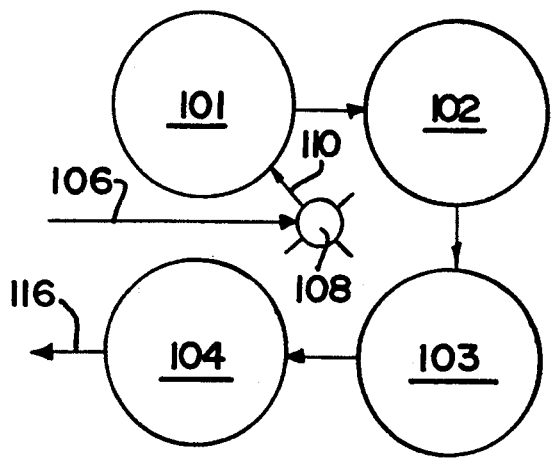
FIGS. 7, 8 and 9 depict schematically the arrangement of vessels for a carousel feeding arrangement, and the operation of such an arrangement.
Figure 8:
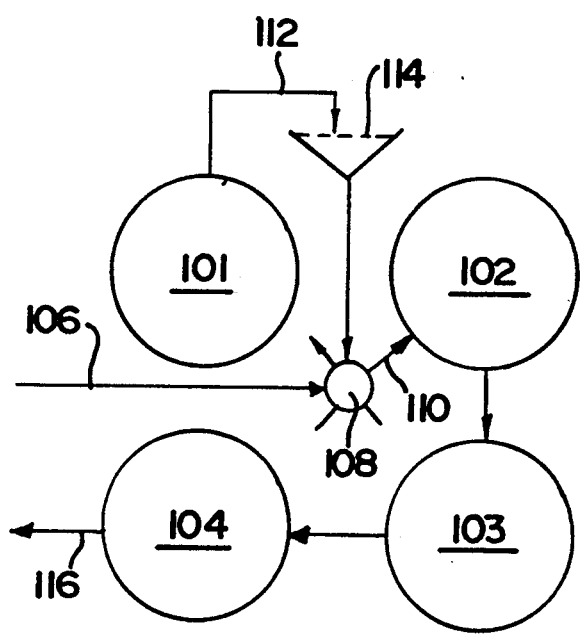
Figure 9:
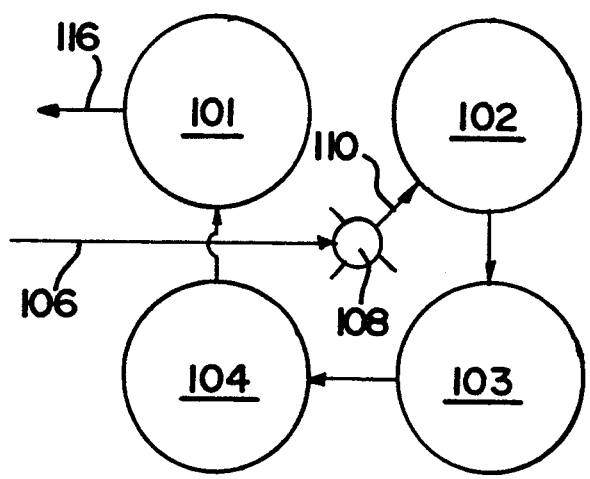

The vessels of a multiple vessel installation may advantageously be arranged for a carousel feeding arrangement, as depicted schematically in FIGS. 7, 8 and 9, where an arrangement of four vessels 101, 102, 203 and 104 is depicted. The flow of solution or pulp is continuous from vessel 101, to 102, 103 and 104 as indicated by the arrows. The carbon/resin adsorbent is retained in a vessel and is not moved counter-currently, but a similar effect is achieved by moving the feedpoint of the solution or pulp.

The start up stage 1 is illustrated in FIG. 7, with solution or pulp being fed via feedline 106 to central distribution point 108 and through feedline 110 into tank 101. Depleted solution or pulp is removed as waste from tank 104 via wasteline 116. When the metal loading onto the carbon/resin in tank 101 is completed, stage 2 is introduced, as shown in FIG. 8. The feedline 110 is now moved to tank 102, and tank 101 is taken off line and is emptied via line 112 over a screen 114 to recover carbon/resin for the subsequent recovery of metal values. The pulp is returned to the circuit at central distribution point 108.

Once tank 101 has been emptied, it is brought back on line, as shown in the next stage, stage 3 as depicted in FIG. 9.

When the resin/carbon in tank 102 is fully loaded with metal values, the procedure is repeated, and tank 102 is isolated and emptied. In this manner successive tanks are emptied, and brought back on line again afterwards, while the feedline 110 is moved from tank to tank accordingly.

Figure 10:
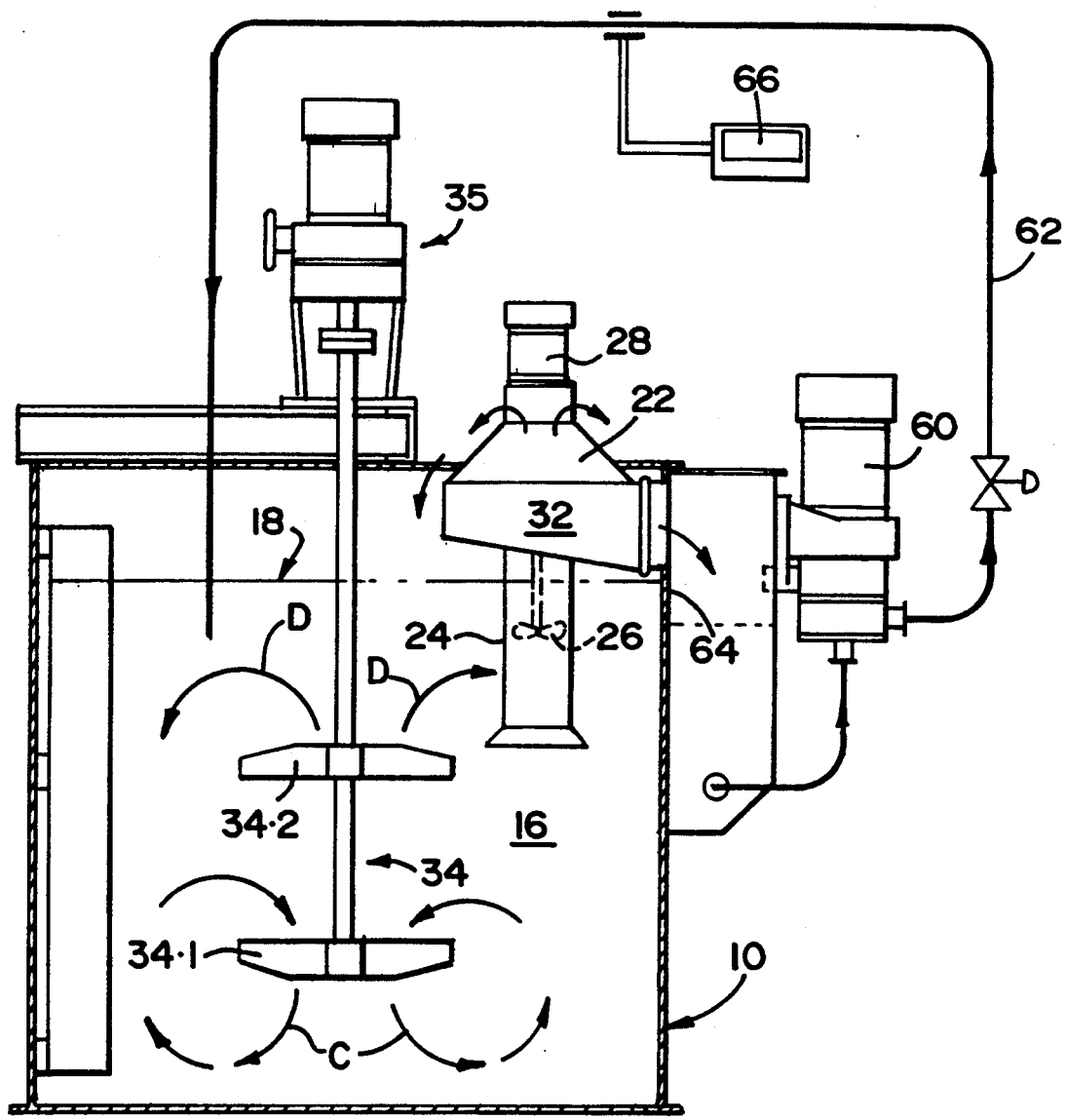
FIG. 10 is a diagrammatic partly sectional view of a vessel set up with a lift pipe and elevated screen, and with a dual blade agitator in accordance with the invention, as a test unit.

Referring now to FIG. 10, in which parts corresponding to similar parts in FIG. 1 are indicated with similar reference numbers, there is depicted an apparatus according to the invention set up as a test unit. The vessel 10 has a diameter of 1,2 m and a height of 1,5 m and level 18 reflects a liquid medium depth of 1,2 m. The liquid medium 16 is in the form of a slurry made up to a relative density of 1,45 and conditioned carbon was added to give a concentration of 85 g C/l.

The agitation impeller 34 has a variable speed drive means, and a dual blade system comprising a lower blade system 34.1 shaped and arranged to effect a down-pumping action (as indicated by the arrows C), and an upper blade system designed to carry out an up-pumping action (as indicated by the arrows D).

A first series of tests were conducted for the evaluation of the agitation efficacy, the mixing efficiency, and attrition losses.

Resuspension tests were conducted after the solids were allowed to settle for 16 hours, by using different impeller speeds and by measuring carbon concentrations and slurry relative density showed that full suspension of solids was achieved in 9 minutes. The results of these tests are illustrated graphically in FIG. 19.

An agitator speed of 110 rpm was selected and used throughout a 1200 hour run for the evaluation of carbon attrition due to the action of the agitator only. Fixed volumes of the slurry 16 with the suspended carbon were taken, and carbon mass and size distribution of each sample recorded. The results are illustrated graphically in FIG. 20. It will be observed that the percentage carbon particles having sizes of between 1,70 mm–2,36 mm, and between 1,18 mm–1,70 mm remained fairly constant, an indication that little carbon attrition took place. This is an indication inter alia of the effectiveness of the dual blade impeller 34.

Analysis of the carbon size distribution, as illustrated graphically in FIGS. 21 and 22, discloses a carbon loss at 800 micron of an equivalent of 4,5 g of carbon per ton of solids treated. A loss of this order is regarded as highly acceptable.

To evaluate the efficiency of the lift impeller and the elevated screening procedure, the following parameters were investigated: flow rates; pump head; optimum screen angle; carbon concentration; and carbon attrition losses.

Referring to FIG. 10, a screen 22 of stainless steel woven wire and with a screen area of 0,1 m² was combined with a variable speed lift impeller 26. A pump 60 was mounted on the side of the vessel 10, to circulate the slurry 16 passing through the screen 22 and collected by the collecting trough 32, in closed circuit along line 62 back to the vessel 10. A weir 64 was provided to measure slurry flows passing through the screen 22, and a flow meter 66 was provided to measure the return flow rate.

Figure 23:
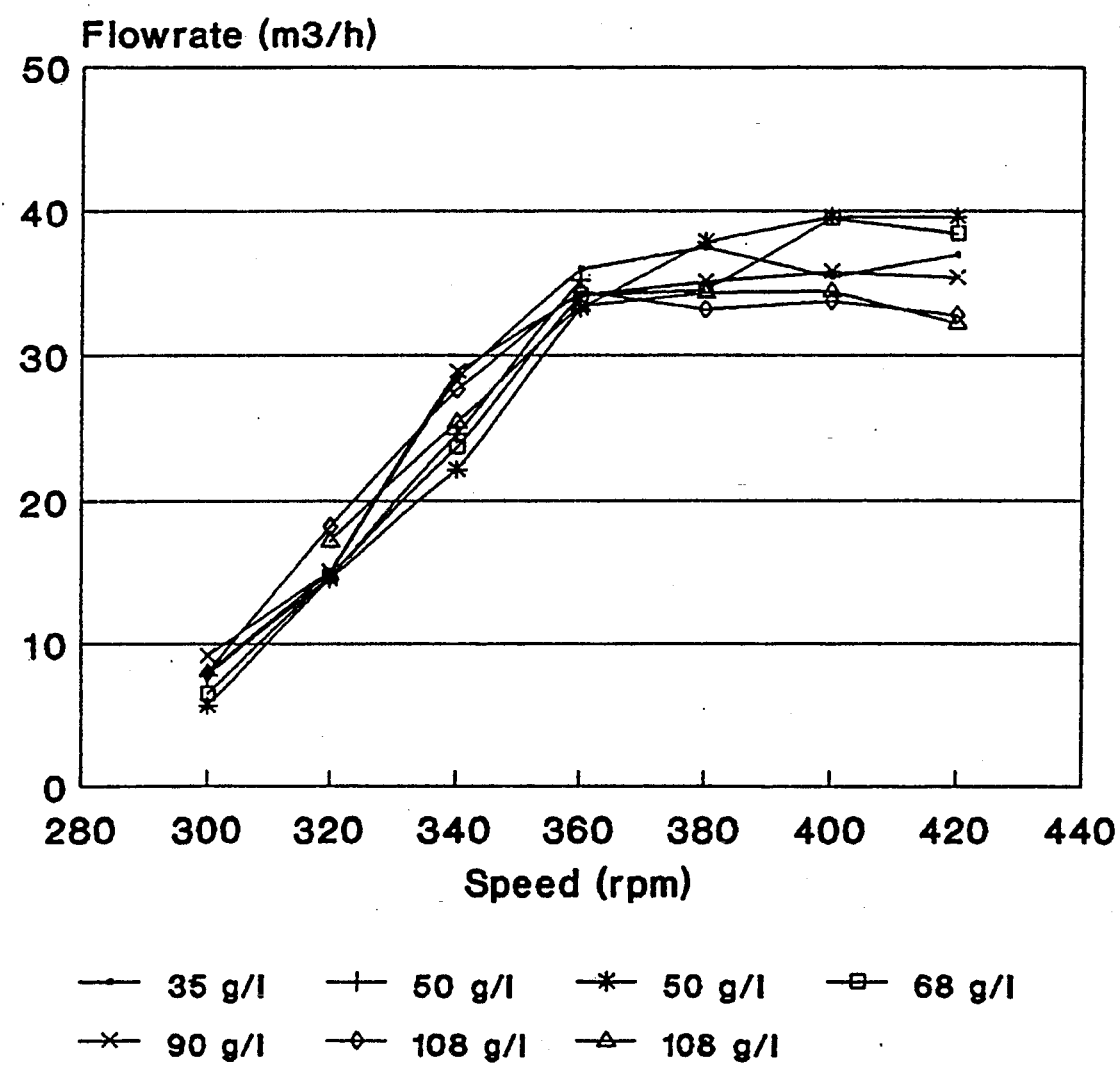
FIG. 23 is a graphic representation of the screening efficacy, plotting different feed flow rates against different lift impeller speeds with different carbon particle concentrations.

Slurry at a relative density of 1,45 was made up and the flow tests repeated with increasing carbon concentrations from 35 g/l to 108 g/l. With a screen aperture of 0,8 mm and wire of 0,46 mm diameter, the flow through the screen peaked at about 34–37 m³/h, showing that through-flow was independent of carbon concentration. The results are illustrated graphically in FIG. 23.

Figure 24:
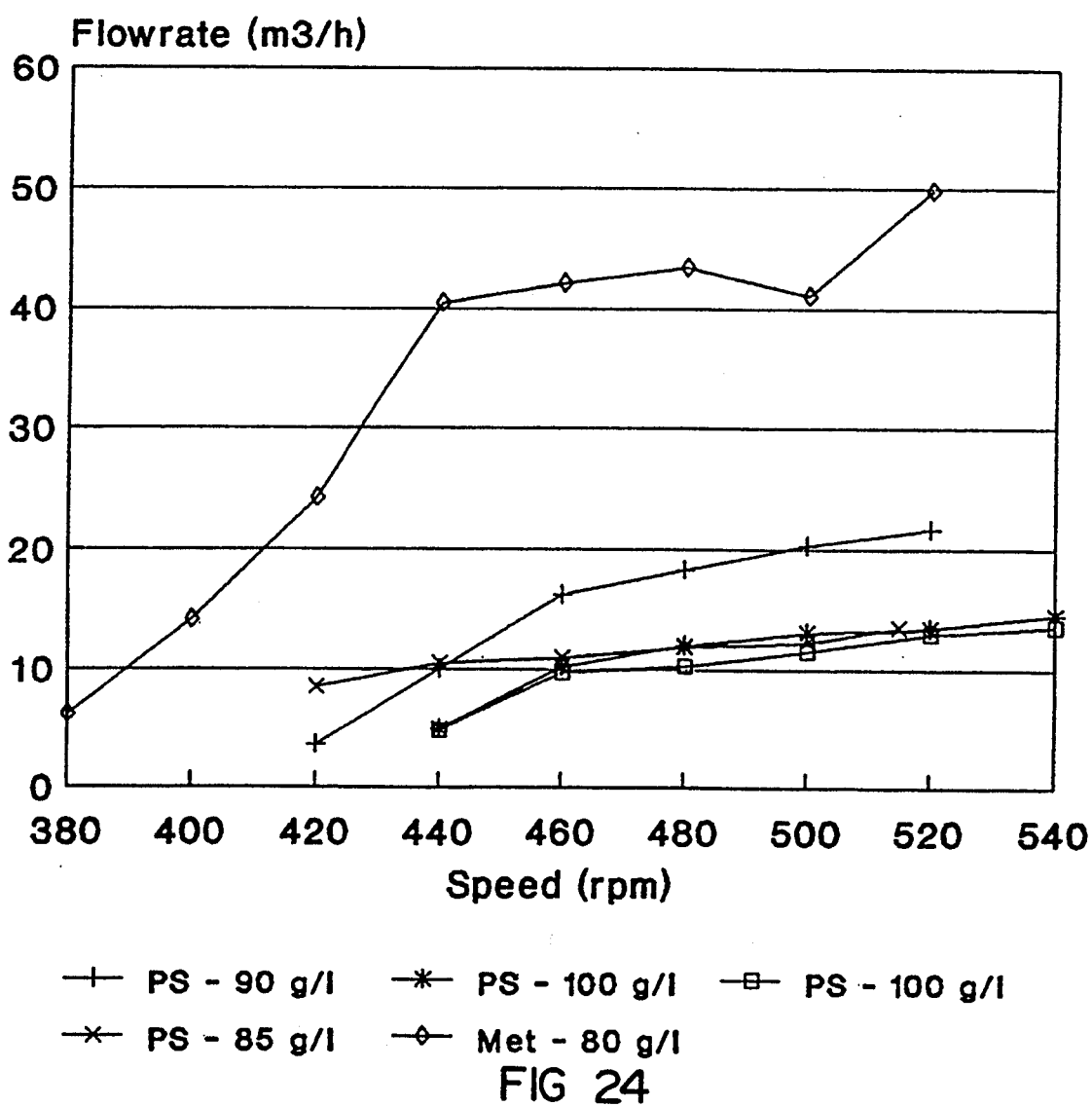
FIG. 24 is a graphic representation of the screening efficacy, showing different liquid feed flow rates plotted against lift impeller rotational speed, with a metal screen and a plastic screen used with different carbon particle concentrations.

Selected conditions were used for testing a woven wire screen of 1,0 mm aperture and a plastic screen of 1,0 mm aperture. The results shown in FIG. 24 show that a plastic screen cloth gives a severely reduced through-flow.

A lift of up to 1 m was achieved with the impeller 26, while a reasonable excess flow of slurry over the screen 22 could be maintained. The angle of the screen 22 should be selected to ensure that a reasonable excess flow of slurry over the screen will be maintained. It was found that a smaller screen angle resulted in increased flows.

In tests conducted with a metal screen (apertures 0,8 mm, wire diameter 0,46 m) and a 0,1 m² screen area, and with different rotational speeds of the lift impeller, it was found that a liquid flow rate of about 30–40 m³/h with a particle concentration of 108 g C/l could be achieved with impeller speeds between about 400–500 rpm and a lift head of about 200 mm. These results are shown in FIG. 18.

Carbon attrition losses were determined over a 984 hour period using the metal screen cloth, and the results are depicted graphically in FIGS. 25, 26 and 27. Total carbon losses were calculated at about 30 g per ton of solids treated; this is regarded as a favourable result.

Figure 11:
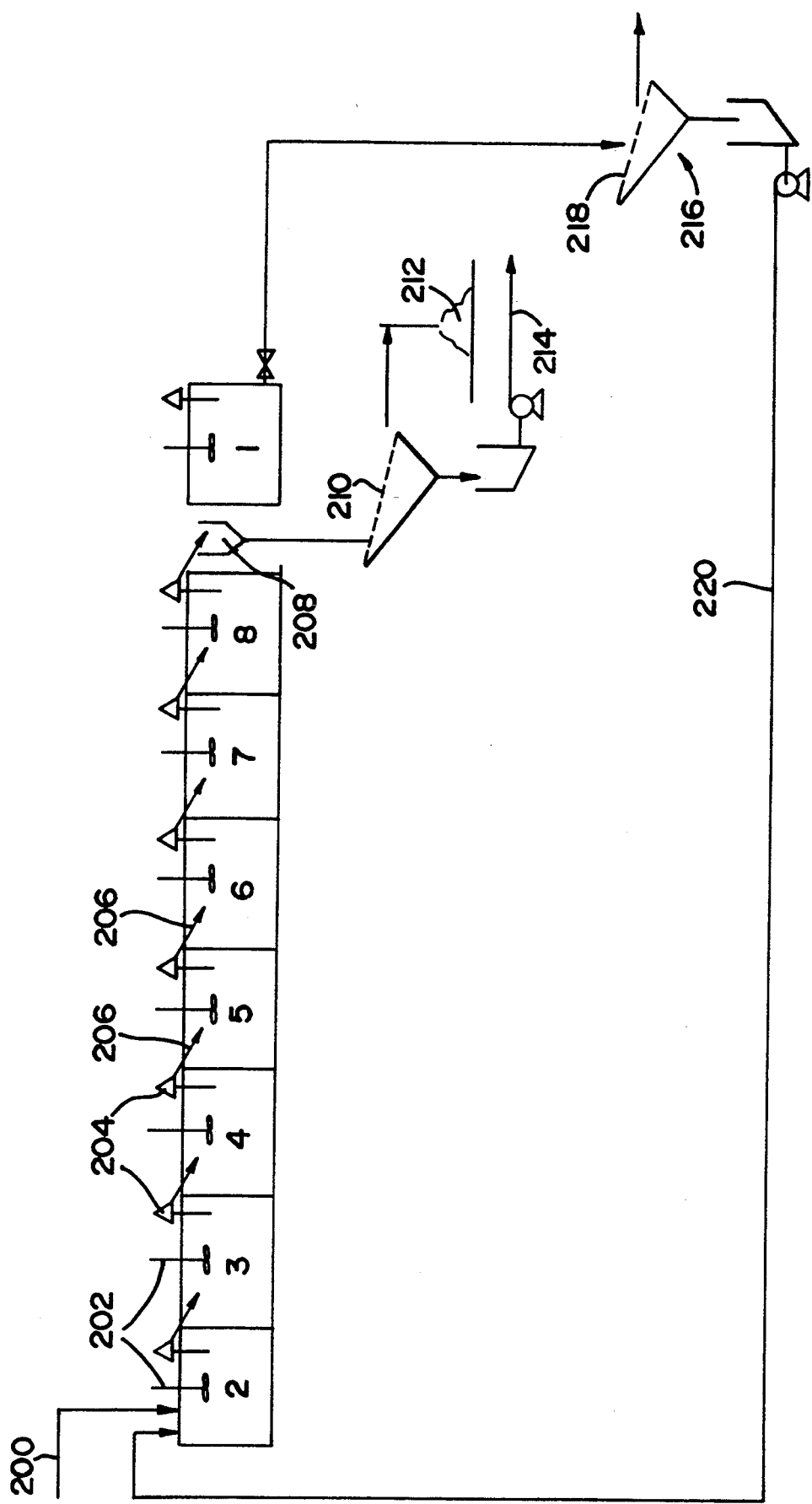
FIG. 11 is a schematic illustration of the operational sequences of a multi-cell installation according to the invention.

Referring now to FIG. 11, there is illustrated schematically the manner in which a multi-cell installation according to the invention may be operated:

In an installation of say eight treatment vessels numbered 1 to 8, a slurry to be treated for the recovery of dissolved metal values may be fed via line 200 from a supply of such slurry (not shown) to vessel 2 (i.e. the feed vessel) and from there in series to each successive vessel. It will be understood that each treatment vessel will have been set up in accordance with the invention with an agitator 202, an elevated screen 204 with lift means for the slurry, and a collecting means for collecting screened slurry and delivering such screened slurry to the next succeeding vessel shown as 206; and each vessel will further contain a suitable quantity of carbon or other absorbent particles (not shown). When the slurry reaches vessel 8, the slurry will be substantially depleted of dissolved metal, and the screened slurry is delivered to a collector vessel or tundish 208, from where it is passed through a safety catch screen 210 to recover any carbon particles (shown as 212) which may be present in the slurry, whereupon the depleted slurry is discarded as tailings via discharge line 214.

The carbon-particles in vessel 1, which was previously the feed vessel, have become fully loaded with metal, and that vessel has been taken off line and by-passed, and the supply of fresh slurry has been moved to vessel 2, which is shown as the feed vessel. It will be appreciated that the carbon particles in the vessel 2 will now be exposed to a metal-rich slurry, with increased metal loading potential.

The contents of the by-passed vessel 1 are drained into a carbon recovery station 216, where the fully loaded carbon particles are removed by a screen 218 for further processing and recovery of the metal; and the separated liquid phase is returned via line 220 to the treatment line, i.e. to the feed vessel 2. The drained vessel 1 will again be brought on line: it will be changed with fresh lean carbon particles, and the screened slurry from vessel 8 (i.e. substantially depleted slurry) will be delivered to said vessel 1 for final metal loading on the fresh carbon, after which the totally depleted slurry will be delivered to the collector vessel or tundish 208, where it will be passed through the safety catch screen 210 before being discarded as tailings, as described above.

In the meanwhile the carbon in the vessel 2 will have become fully loaded, so that vessel 2 will be taken off line to be drained, while the supply of fresh slurry 200 will be moved to the vessel 3, which then becomes the feed vessel. In this manner the supply of fresh slurry is rotated cyclically, and depleted slurry as well as loaded carbon are removed cyclically, to achieve optimum removal of metal values.

Figure 12:
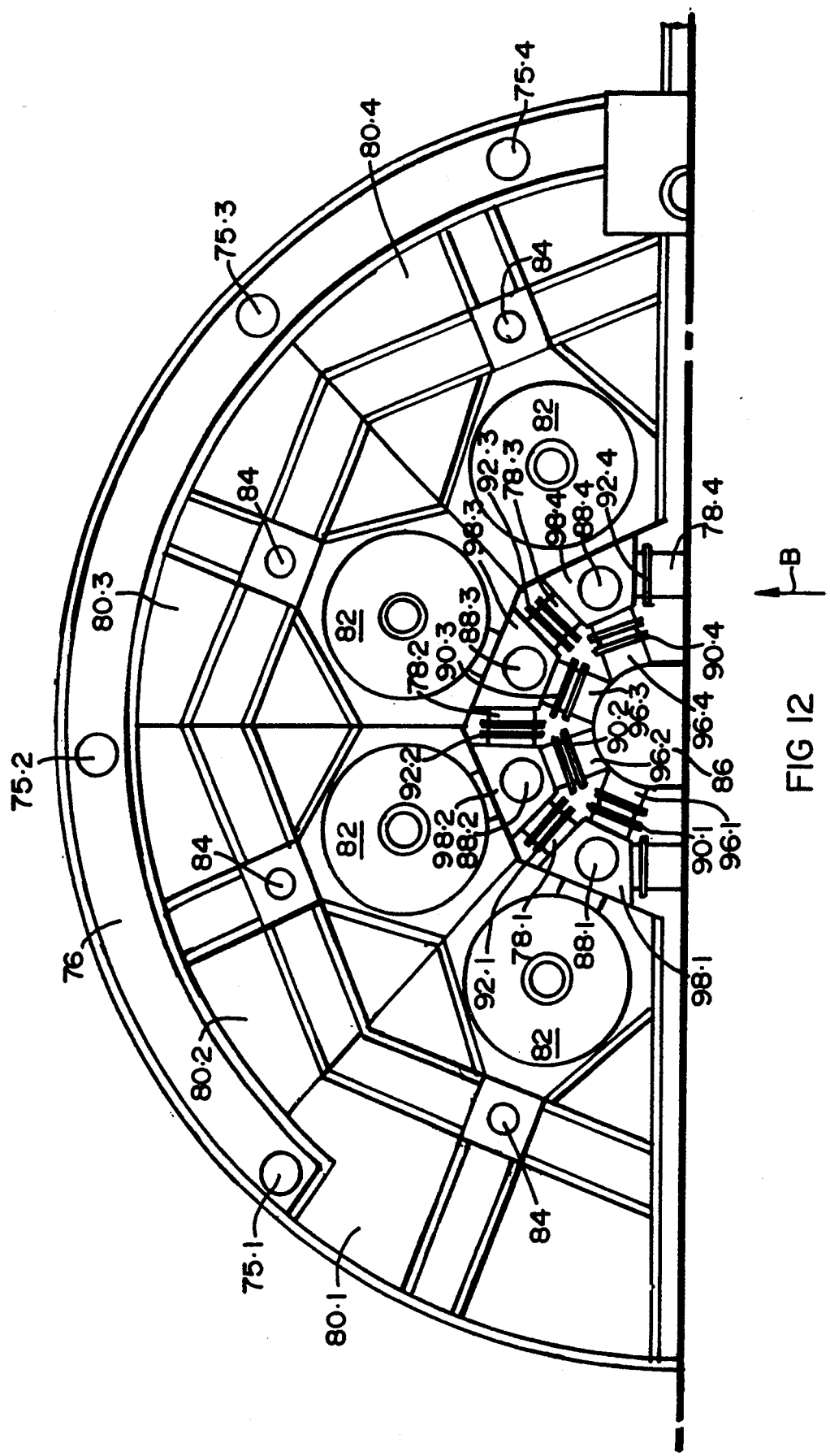
FIG. 12 is a diagrammatic partial top plan view of a multi-cell installation in accordance with the invention, only four of the eight vessels being shown.
Figure 13:
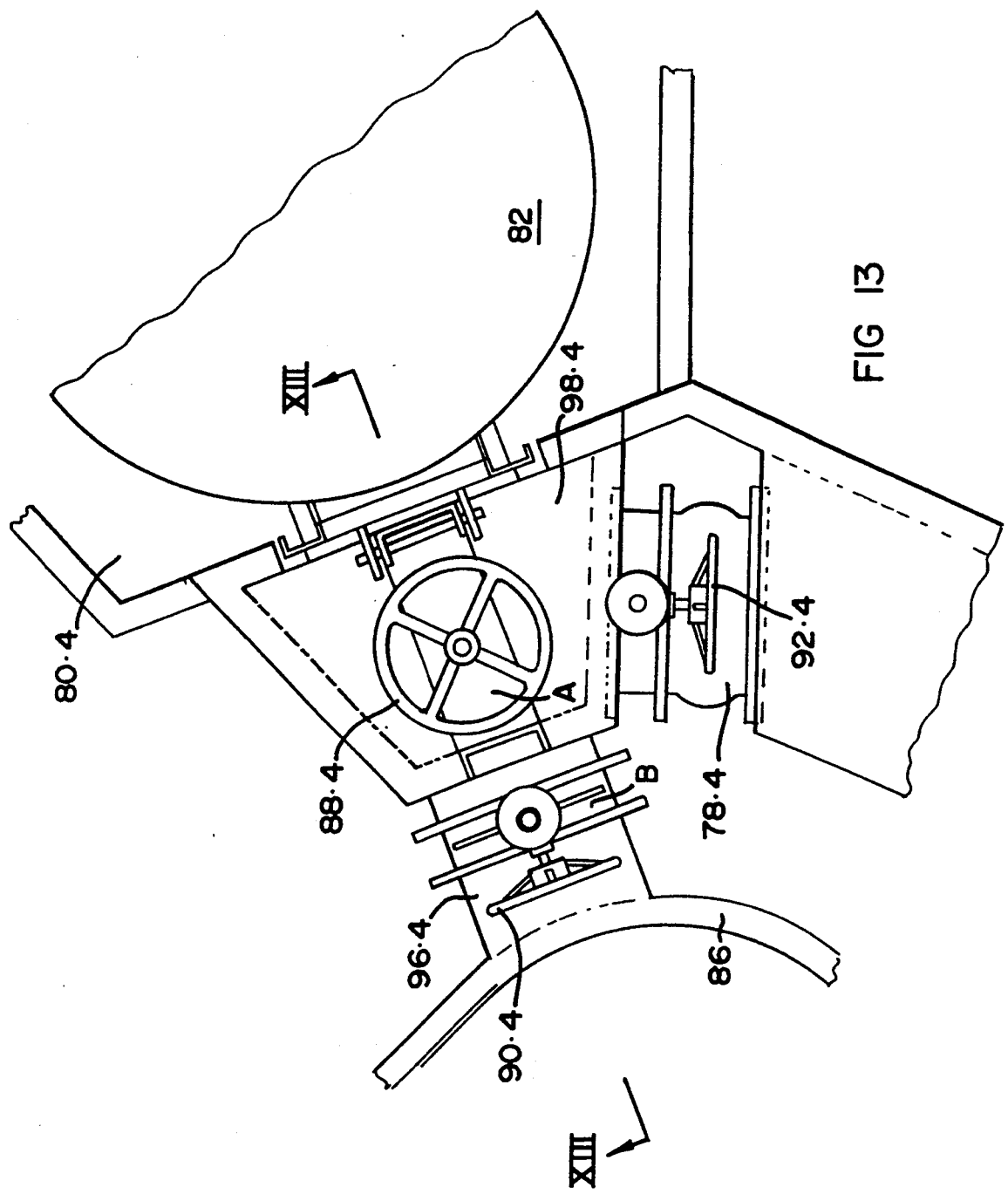
FIG. 13 is a partial plan view of a detail of FIG. 12, to depict the outlet and by-pass valves in respect of a unit cell.
Figure 14:
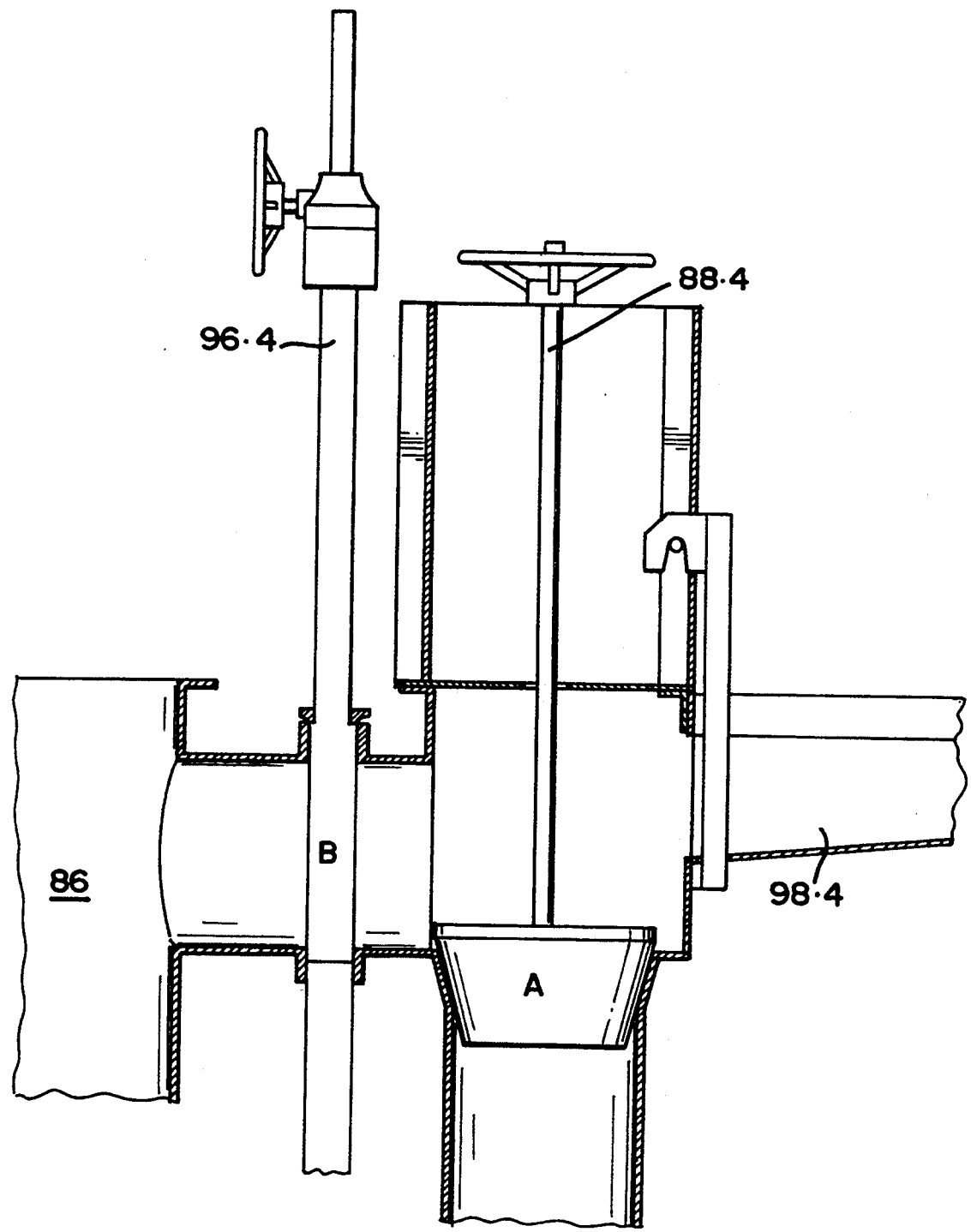
FIG. 14 is a vertical sectional view of the outlet and by-pass valves of FIG. 13, taken along line XIV—XIV in FIG. 13.
Figure 15:
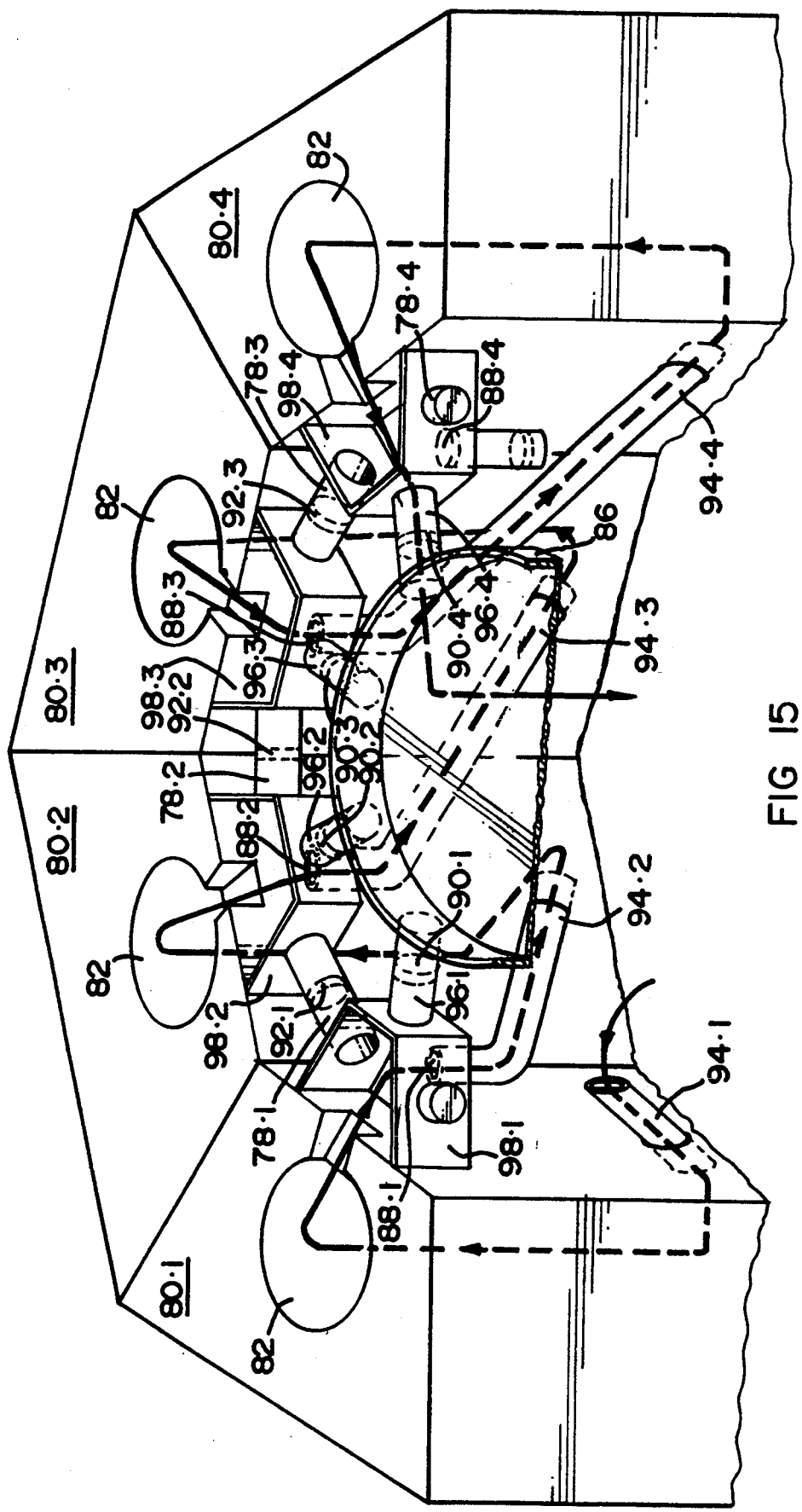
FIG. 15 is a diagrammatic three-dimensional partial view of the four vessels of a multi-cell installation depicted in FIG. 12, to show the liquid flow lines between successive cells during normal operation of the installation.
Figure 16:
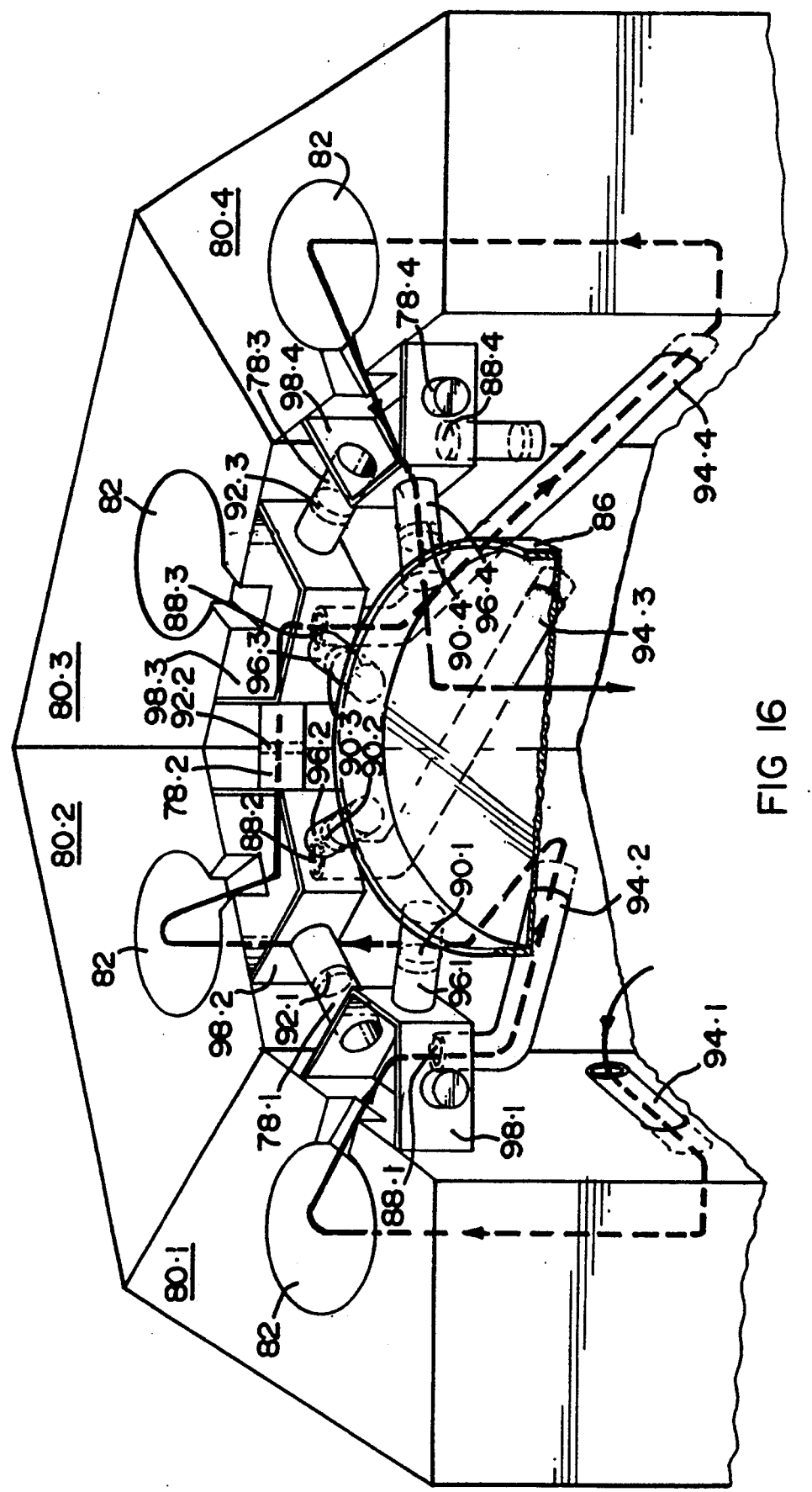
FIG. 16 is a three-dimensional view corresponding to FIG. 15, but depicting the liquid flow lines when one cell has been isolated and is being by-passed for the purpose of draining.
Figure 17:
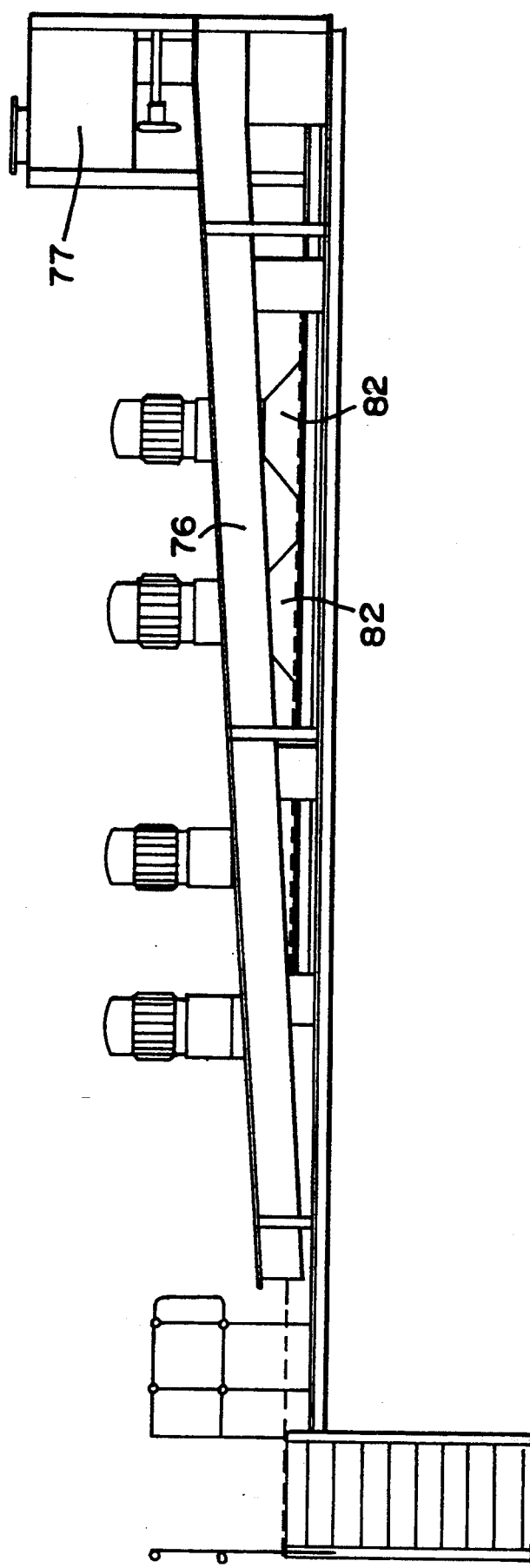
FIG. 17 is a diagrammatic side elevation of the installation shown in FIG. 11, viewed in the direction of the arrow B in FIG. 11.

Referring now to FIGS. 12 to 17, there is illustrated by way of example one embodiment of a multi-cell installation comprised of eight quadrangular vessels, arranged in two halves of four vessels each. One four-vessel module is depicted in FIG. 12, having vessels 80.1, 80.2, 80.3 and 80.4 each with a frusto-conical elevated screen 82 and an agitation impeller 84. A central collector vessel or tundish 86 is provided. The individual vessels 80.1, 80.2, 80.3 and 80.4 are interconnected in series, and have outlets into the central collector vessel or tundish 86, as will be described more fully below. The flow feed lines are controlled by means of valves to permit serial flow as illustrated in FIG. 15, and to permit a vessel to be taken off line and by-passed, as illustrated in FIG. 16, to permit the contents to be drained for further processing. As explained before, a vessel will be taken off line and drained when the carbon particles have been substantially fully loaded with adsorbed metal, and the loaded carbon particles are collected for further processing to recover the metal.

As illustrated in FIGS. 15 and 16, the liquid flow inlet into each vessel is located in the lower region of the vessel, through inlet conduits 94.1, 94.2, 94.3 and 94.4 respectively. Each cell also has an outlet box 98.1, 98.2, 98.3 and 98.4 respectively, into which the screened liquid medium is delivered from the screen 82. Each outlet box is connected to the inlet conduit of an adjacent cell. Liquid flow through the conduits are controlled by valves 88.1, 88.2, 88.3 and 88.4 respectively.

The outlet boxes 98.1, 98.2, 98.3 and 98.4 of adjacent cells are interconnected by launder conduits 78.1, 78.2, 78.3 and 78.4, so that the outlet boxes and interconnecting conduits form an inner launder system. Flow through the inner launder conduits 78.1, 78.2, 78.3 and 78.4 is controlled by the valves 92.1, 92.2, 92.3 and 92.4.

An outer feed launder 76 is provided, for supplying the solution or pulp to be treated from a supply head tank 77 (see FIG. 17), with valves 75.1, 75.2, 75.3 and 75.4 being provided to control the supply of solution or pulp to individual vessels 80.1, 80.2, 80.3 or 80.4 in rotational sequence.

Each outlet box 98.1, 98.2, 98.3 and 98.4 also has an outlet into the central collector vessel or tundish 86, shown as 96.1, 96.2, 96.3 and 96.4 and flow through these outlets is controlled by valves 90.1, 90.2, 90.3, 90.4.

As shown diagrammatically in FIG. 14, the valve 88.4 (and valves 88.1, 88.2, 88.3) may be a plug type valve, while the valve 90.4 (and the valves 90.1, 90.2, 90.3 and 92.1, 92.2, 92.3 and 92.4) may be a knife gate valve.

During normal operation of the installation, when serial flow of the liquid medium takes place, the valves 88.1, 88.2, 88.3 and 88.4 will be open, and flow will take place as shown by the arrows in FIG. 15. The liquid shown to enter the inlet conduit 94.1 of the vessel 80.1 will be liquid medium fed from the other vessels (not shown) in the installation. Solution or pulp containing solubilised metal will be fed from the reservoir 77 via the external launder 76 to one of the vessels (not shown) where the first stage of the metal transfer from the solution or pulp onto the carbon particles will take place. Continuous screening and separation of the partly loaded particles will take place in each vessel, and the screened liquid will be fed to the inlet of the adjacent vessel.

When it is desired to take a vessel, eg 80.3 off line (as illustrated in FIG. 16), for the purpose as explained above, the valve 88.2 controlling flow through the conduit 94.2 of the vessel 80.2 is closed, to prevent liquid from flowing into the vessel 80.3 via the conduit 94.3. Instead the valve 92.2 in the launder conduit 78.2 will be opened and liquid will flow into the outlet box 98.3; the valve 88.3 will be opened, and liquid will flow to the vessel 80.4 via conduit 94.4.

When it is desired to drain the liquid from a vessel, as described above, a separate drain valve (not shown) at the bottom of the vessel is opened, to allow the contents of the vessel to be directed to a further processing station. Here, the loaded carbon is separated from the liquid by means of a screen device, for further treatment to recover the metal, and the liquid is returned to the feed vessel.

We claim:

1. An installation for maintaining a particulate material in suspension in a liquid medium and for continuously separating the particulate material from the liquid medium in which the particles are suspended, which includes a plurality of vessels for the liquid medium, each vessel having an inlet to charge liquid medium into the vessel to a predetermined level and an outlet;

independently operable and separate agitation means provided within each said vessel for maintaining particulate material in the vessel in suspension in the liquid medium;

an open-ended lift pipe mounted substantially upright in each said vessel to present an upper end and a lower end, with the lower end of the lift pipe submerged in the liquid medium and the upper end extending above said level of the liquid medium;

a screen provided in each said vessel, the screen being mounted on the upper end of the lift pipe to be located in a position substantially above the liquid medium and being arranged at an angle to the horizontal to present an upper screen area and a lower screen area and with at least the upper screen area at an elevation above the said liquid level;

separate means in the form of an axial flow impeller provided within the lift pipe for causing an upward flow through the lift pipe of a portion of the liquid medium with suspended particles in each said vessel to a level at least as high as the upper area of the screen, and for continuously discharging that portion of the liquid medium with suspended particles onto the upper area of the screen, thereby causing a flow of liquid medium and particles under force of gravity down the screen from the upper area of the screen to the lower area of the screen, with the liquid passing through the screen and the particles being retained on the screen;

collecting means for collecting screened liquid medium having passed the screen and conveying it to the aforesaid outlet of each said vessel; and conduit means provided for each said vessel for feeding the collected liquid medium from the said outlet of each said vessel to the inlet of a succeeding vessel at least partially under force of gravity.

2. An installation as claimed in claim 1, in which the screen is of frusto-conical open-ended configuration, with its narrow opening arranged around the upper end of the lift pipe, and so that the screen slants downwardly and outwardly from the upper end of the lift pipe; the arrangement being such that the entire screen is situated above the said level of the liquid medium in the vessel, and the angle of the screen to the horizontal being selected to achieve effective screening of the liquid phase of the said flow of liquid medium with suspended particles discharged onto the screen while preventing excessive liquid run-off over the screen surface.

3. An installation as claimed in claim 2, in which the screen is comprised of a plurality of separate screen panels mounted on a support structure, the panels having releasable securing means whereby individual panels may readily be removed and replaced.

4. An installation as claimed in claim 1, in which the said plurality of vessels are arranged on the same floor level and in a cluster configuration, and in which the inlet of each vessel is provided in a lowed region of the vessel while the outlet of each vessel is provided in an upper region of the vessel, and in which the said conduit means provided for each vessel includes liquid flow conduits connecting said outlet of each said vessel with said inlet of a succeeding and adjacent vessel, the arrangement being such as to permit serial liquid flow between said adjacent vessels at least partially under force of gravity; and in which a separate collector vessel is provided, and in which further liquid flow conduits are provided connecting each of the said plurality of vessels to the collector vessel.

5. An installation as claimed in claim 4, in which control valve means are provided in each of the liquid flows conduits to permit flow from each of the said plurality of vessels to be directed either into an adjacent vessel or into the collector vessel.

6. An installation as claimed in claim 5, in which the control valve means are arranged to permit a vessel to be taken off line so as to be by-passed.

7. An installation as claimed in claim 6, in which each said vessel is provided with a drain outlet to permit the contents of a said by-passed vessel to be drained for further processing.

8. An installation as claimed in claim 4, in which screening means are provided in the collector vessel to permit particulate material to be separated from liquid medium containing suspended particles fed to the collector vessel.

9. An installation as claimed in claim 1, in which the screen of each said vessel is provided at an elevation above the predetermined liquid medium level of that vessel, so that hydraulic head will be created when a said portion of the liquid medium is lifted to the screen, and in which the rotational speed of said axial flow impeller, and the characteristics of the screen are such that in operation a hydraulic lift head of about 200 mm will be achieved with a liquid flow rate of between about 30–40 $m^3/h$ and a particle concentration of the particulate material in the said liquid medium of not less than about 100 g/l.

* * * * *